US008750882B2

(12) United States Patent  
Yang et al.

(10) Patent No.: US 8,750,882 B2  
(45) Date of Patent: Jun. 10, 2014

(54) METHOD FOR COOPERATIVE CONTROL OF POWER AMONG BASE STATIONS AND BASE STATION DEVICE USING SAME

(75) Inventors: Suck Chel Yang, Anyang-si (KR); Byoung Hoon Kim, Anyang-si (KR); Jin Bae Park, Incheon (KR); Min Gyu Kang, Seoul (KR); Kwang Soon Kim, Seoul (KR); Ki-Jun Kim, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 347 days.

(21) Appl. No.: 13/378,970

(22) PCT Filed: Jun. 15, 2010

(86) PCT No.: PCT/KR2010/003845  
§ 371 (c)(1),  
(2), (4) Date: Jan. 25, 2012

(87) PCT Pub. No.: WO2010/147371  
PCT Pub. Date: Dec. 23, 2010

(65) Prior Publication Data  
US 2012/0122513 A1   May 17, 2012

(30) Foreign Application Priority Data

Jun. 16, 2009 (KR) .................. 10-2009-0053499  
Jul. 8, 2009 (KR) .................. 10-2009-0062054

(51) Int. Cl.  
*H04W 36/00* (2009.01)

(52) U.S. Cl.  
USPC .......................... 455/443; 455/452.2

(58) Field of Classification Search  
CPC . H04W 52/367; H04W 92/20; H04W 52/143; H04W 52/267; H04W 72/0426  
USPC .................. 455/443, 444, 452.2, 69, 522  
See application file for complete search history.

(56) References Cited

U.S. PATENT DOCUMENTS

2004/0233867 A1* 11/2004 Wheatley et al. ............ 370/328  
2007/0077945 A1    4/2007 Sheynblat  
(Continued)

FOREIGN PATENT DOCUMENTS

KR   10-2008-0029421 A   4/2008  
KR   10-2008-0037398 A   4/2008  
(Continued)

*Primary Examiner* — Tu X Nguyen  
(74) *Attorney, Agent, or Firm* — Birch, Stewart, Kolasch & Birch, LLP

(57) ABSTRACT

A method for cooperative control of power among base stations and a base station device which performs the same are discussed. A first receiving unit is configured such that a specific base station in a cooperative unit receives, from a specific terminal located on a cell edge of the specific base station, token value information which indicates an average transmission rate of the specific terminal and the up-to-date level of satisfaction of the minimum average transmission rate of the specific terminal. A second receiving unit receives, from one or more other base stations in the cooperative unit, information containing an average transmission rate of terminals located on edges of each of the base stations, token values of terminals located on cell edges of each of the base stations, and the current power levels of each of one or more base stations.

20 Claims, 22 Drawing Sheets

(a)

(b)

(56) References Cited

U.S. PATENT DOCUMENTS

2008/0132262 A1  6/2008  Jung et al.
2010/0099352 A1  4/2010  Lee et al.
2010/0303032 A1  12/2010 Seo et al.

FOREIGN PATENT DOCUMENTS

| | | |
|---|---|---|
| KR | 10-2008-0041268 A | 5/2008 |
| KR | 10-2009-0055802 A | 6/2009 |

* cited by examiner

FIG. 17

| MS ID (1) | Pwr Lev (1) | ... | MS ID (Ns) | Pwr Lev (Ns) | Avg Rate (1) | ... | Avg Rate (k) | MS ID (1) | Pwr Lev (1) | ... | MS ID (Ns) | Pwr Lev (Ns) | Avg Rate (1) | ... | Avg Rate (k) |
|---|---|---|---|---|---|---|---|---|---|---|---|---|---|---|---|

Subchannel-based allocation result and average transmission rate of cell(1) | Subchannel-based allocation result and average transmission rate of cell(n)

Subchannel-based allocation result and average transmission rate of cell(n)

METHOD FOR COOPERATIVE CONTROL OF POWER AMONG BASE STATIONS AND BASE STATION DEVICE USING SAME

TECHNICAL FIELD

The present invention relates to a method for cooperative control of power among base stations (BSs) and a BS device using the same.

BACKGROUND ART

In a conventional downlink multiplex cellular communication system in which BSs share the same frequency resources, each BS determines the power thereof such that the power does not exceed a peak power assigned thereto only considering channel states of user equipments (UEs) belonging thereto regardless of other BSs.

However, allocation of power to a BS using this method causes problems in a system using frequency reuse factor of 1. When a UE is located at a cell edge far away from a BS, signal power is weakened due to signal attenuation according to distance in a radio channel environment and communication performance is remarkably deteriorated by interference signals from other BSs. Accordingly, the UE located at the cell edge (referred to as a cell edge UE hereinafter) is difficult to be provided with high quality communication services.

To solve these problems, researches on a cell cooperation method have been actively carried out recently. Management of cell edge UEs through cell cooperation can help provide better communication services to the cell edge UEs. However, the cell cooperation method requires excessive information exchange between BSs through backhaul and calculations with high complexity. Therefore, researches on feasible information exchange and an algorithm having low complexity are needed.

An interference signal coming from a neighboring BS most largely affects the performance of a UE on downlink. Since the power of the neighboring BS is an important factor that constitutes the interference signal affecting the UE, appropriate control of the power of the neighboring BS is very important for improvement of system performance as well as performance of cell edge UEs.

To implement, there has been studied a method for controlling transmit power to enhance fairness for neighboring BSs in a cellular mobile communication system. According to this method, BSs separate responses to traffic transmitted to UEs into ACK signals and NACK signals and receive the ACK signals and the NACK signals from the UEs such that a BS for which NACK signals are generated most frequently transmits signals with as high power as possible and a BS for which a lowest number of NACK signals are generated transmits signals with as low power as possible on the basis of the percentage of the NACK signals in the whole traffic.

Neighboring BSs share the percentage of NACK signals. In view of this, there was a proposed a method for reducing magnitudes of interference signals generated from neighboring BSs through cooperation between neighboring BSs to improve fairness among cells. That is, the above-mentioned conventional method calculates transmit power of a BS using a transmit power transmission coefficient calculated by the BS in response to whether or not data has been successfully transmitted to a UE from the BS and exchanges the calculated transmit power between neighboring BSs so as to achieve fairness between cells through a negotiation between the cells.

In this conventional method, data is coded and transmitted according to a given channel state in the actual communication environment. Here, a coding rate plays an important role in successfully transmitting data. However, successful data transmission depends on how the coding rage is appropriately determined in response to the channel state, and thus it is not appropriate to discuss fairness on the basis of success or failure in transmitting data to each cell in the actual communication environments.

Furthermore, considering a communication system that satisfies minimum average transmission rates of UEs, the aforementioned conventional method cannot meet the condition of this communication system. Moreover, even though fairness of one cell can be discussed on the basis of success or failure in transmitting data to the cell in the conventional method, if a negotiation is conducted between cells to reduce the power of a neighbor cell on the basis of a cell in a poor state, the maximum power of a neighboring cell which does not need power control is also decreased.

Since a degree of influence of a neighboring cell on UEs belonging to a certain cell depends on locations of the UEs, if the certain cell can distinguish a cell having a great influence thereon, reducing the maximum power of the cell is much more efficient than decreasing power of all neighboring cells.

Therefore, the aforementioned conventional method has problems of limiting the average transmission rate of a concerned cell so as to bring about deterioration of the performance of the overall system because it restricts even the power of a neighboring cell which barely affects the concerned cell. It is necessary to conduct negotiations based on calculation results of BSs in consideration of many factors in a state the BSs share as much information about them as possible. However, the above-described conventional method processes information including only feedback information on UEs belonging to BSs and conducts a negotiation between the BSs using the processed information. Accordingly, a proper negotiation cannot be performed since the BSs cannot be aware of information abut the other BSs.

As described above, conventional technologies have many problems. In addition, there have not been proposed a BS power control method and a BS device using the same for securing fairness among cells, particularly, a minimum average transmission rate of a cell edge UE and efficiently determining powers of BSs through information sharing between BSs in a down link multiplex cellular system.

A cellular system, which is a concept suggested to overcome limit of a service area and a restriction on subscriber capacity, divides a service area into small areas, that is, cells or sectors, and uses the same frequency band for two cells located sufficiently apart from each other to achieve spatial frequency reuse. A cell means a service area covered by one radio BS and a plurality of cells constitutes a service area corresponding to one system.

The cellular system has characteristics of frequency reuse, cell segmentation, handoff (or handover), etc. The cellular system uses the same frequency for different cells to maximize subscriber capacity. At this time, a frequency reuse distance depends on topographical characteristics, antenna height, transmit power, etc. Cell segmentation is one of methods for maximizing the subscriber capacity. Cells in the cellular system are independent areas having different channels and generate a call path at the request of a subscriber.

In a multiplex cellular system, each cell assigns radio resources including time, frequency and power to each UE in consideration of only itself. When communication is carried out between a BS and a UE, communication performance may be deteriorated due to interferences from neighboring cells using the same time and frequency band as those of the cell including the UE. Communication performance deterioration may be aggravated as the distance between the UE and a cell edge decreases.

This communication performance deterioration may become a problem in not only a current multiplex cellular system but also a next-generation mobile communication system expected to have an increasing number of small- and medium-sized cells such as femto-cells, pico-cell and the like. To provide a fast data service with stability, it is necessary to effectively overcome interferences from neighboring cells irrespective of locations of UEs or channel states.

Recently, researches on multi-cell cooperative communication have been actively carried out in order to overcome the communication performance deterioration. As a representative research result, M. K. Karakayali et al. proposed a scheme of performing dirty paper coding among BSs to maximize minimum transmission rates of UEs during signal transmission considering BSs and UEs belonging to multiple cells as virtual multiple-input and multiple-output (MIMO) systems, which is described in "On the maximum common rate achievable in a coordinated network" published in "IEEE International Conference on Communications (ICC)" in 2006.

The scheme proposed in the above paper can effectively reduce the influence of interference and obtain diversity gain so as to maximize efficiency of utilization of radio resources and considerably improve a minimum transmission rate of a UE in a poor channel state.

Dirty paper coding, one of previous interference signal removal technologies, enables a transmitting side to previously remove an interference signal when the transmitting side is aware of the interference signal such that a receiving side is not affected by the interference signal. This coding technique is drawing attention as a scheme of theoretically securing capacity in a Gaussian downlink environment having multi-user MIMO.

In general, two independent codes are used to implement dirty paper coding. One of them is an error correcting code used to restore original information from a received signal damaged by a channel and the other is a shaping code capable of minimizing power consumption of a transmitting side by shaping transmitted signals into a form similar to a square. A receiver can gradually increase decoding reliability by using an iterative decoding scheme between two decoders corresponding to the two codes. A dirty paper coding system implemented in this manner has performance which approximates Shannon limit.

A description will be given of a conventional method for performing dirty paper coding on a signal and transmitting the coded signal, to thereby maximize minimum transmission rates of UEs.

Each cell selects a UE according to an arbitrary scheduling scheme (step 1). Each BS transmits information on current channel states between the BS and selected UEs and information on signals transmitted to the UEs to other BSs in a cooperative unit, a representative BS which performs dirty paper coding, or a radio network controller (referred to as RNC hereinafter) (step 2).

Each BS, the representative BS performing dirty paper coding or the RNC performs dirty paper coding which maximizes minimum transmission rates of the UEs selected in step 1 in a virtual MIMO system environment created between BSs in the cooperative unit and the UEs using the information transmitted from step 2 (when an arbitrary BS or the RNC acts as a representative to perform dirty paper coding, it transmits information regarding execution of the dirty paper coding to the BSs in the cooperative unit) (step 3). Then, each BS transmits a signal in response to the scheduling and dirty paper coding results (step 4).

The above-mentioned method supposes a communication system capable of performing joint processing between BSs in the cooperative unit in order to use the dirty paper coding. Accordingly, each BS needs to exchange an excessive amount of information including current channel state information and transmission signal information with respect to all UEs, information regarding execution of dirty paper coding and the like with other BSs or a device acting as a representative to perform dirty paper coding in the cooperative unit at every scheduling interval.

It is difficult to use dirty paper coding for optimized radio resource management in practice since a massive amount of calculations are required to perform the dirty paper coding and complexity of the calculations is considerably high. Furthermore, since UEs are allocated prior to dirty paper coding, it is impossible to simultaneously consider minimum transmission rates of all UEs belonging to a cooperative unit when each cell includes a plurality of UEs.

There has not been proposed an efficient cell cooperative radio resource management method capable of securing minimum transmission rates of all UEs belonging to a cooperative unit and considering proportional fairness while having an overhead and complexity permissible in a practical system.

DISCLOSURE

Technical Problem

An object of the present invention devised to solve the problem lies in a BS cooperative power control method.

Another object of the present invention is to provide a BS device which performs a BS cooperative power control method.

Yet another object of the present invention is to provide a cooperative radio resource management method.

It will be appreciated by persons skilled in the art that the objects that can be achieved with the present invention are not limited to what has been particularly described hereinabove and the above and other objects that the present invention can achieve will be more clearly understood from the following detailed description.

Technical Solution

In accordance with one aspect of the present invention, there is provided a method for controlling power cooperatively among two or more base stations (BSs) in a cooperative unit, the method comprising: receiving, at a specific BS in the cooperative unit from a specific user equipment (UE) located on a cell edge of the specific BS, an average transmission rate of the specific UE and a token value that indicates an up-to-date level of satisfaction of a minimum average transmission rate of the specific UE; receiving, at the specific BS, information including average transmission rates of UEs located on cell edges of one or more other BSs in the cooperative unit, token values of the UEs located on the cell edges, and current power levels of the one or more other BSs from the one or more other BSs; calculating, at the specific BS, a first power level vector of each of the BSs in the cooperative unit, which guarantees minimum average transmission rates of UEs located on cell edges of the BSs, using the minimum average transmission rates and token values of the specific UE and the UEs located on the cell edges of the one or more other BSs in the cooperative unit; and calculating, at the specific BS, a second power level vector corresponding to an updated power level of each of the BSs in the cooperative unit based on current power levels of the BSs and the first power level.

In accordance with another aspect of the present invention, there is provided a base station (BS) for controlling power in cooperation with BSs in a cooperative unit, the BS comprising: a first receiving unit configured to receive an average transmission rate of a specific UE located on a cell edge of the BS and a token value that indicates an up-to-date level of satisfaction of a minimum average transmission rate of the specific UE, from the specific UE; a second receiving unit configured to receive information including average transmission rates of UEs located on cell edges of one or more other BSs in the cooperative unit, token values of the UEs located on the cell edges, and current power levels of the one or more other BSs from the one or more other BSs in the cooperative unit; a first power level calculation unit configured to calculate a first power level vector of each of the BSs in the cooperative unit, which guarantees minimum average transmission rates of UEs located on cell edges of the BSs, using the minimum average transmission rates and token values of the specific UE and the UEs located on the cell edges of the one or more other BSs in the cooperative unit; and a second power level calculation unit configured to calculate a second power level vector corresponding to an updated power level of each of the BSs in the cooperative unit based on current power levels of the BSs and the first power level.

Advantageous Effects

According to embodiments of the present invention, it is possible to calculate a BS power that satisfies minimum average transmission rates and proportional fairness of UEs while considering inter-cell interference so as to control the BS power.

According to embodiments of the present invention, a multiplex cellular communication system which performs cell cooperative communication does not require multiple calculating operations for dirty paper coding, and the influence of inter-cell interference can be effectively reduced according to a low overhead and a small amount of calculations by assigning power, time and frequency through a cell cooperative radio resource management scheme.

Furthermore, the present invention can dynamically select a cell cooperative radio resource management scheme, a signal-to-noise ratio and an average transmission rate transmission interval suitable for system and channel environments to reduce an overhead and complexity involved in cooperative radio resource management.

In addition, the present invention can ensure minimum transmission rates of an increased number of UEs over conventional technologies by simultaneously considering all UEs.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 17 illustrates an exemplary signal transmitted by an m-th BS for cooperative radio resource management of an (m+1)-th BS in the second cooperative radio resource management scheme;

BEST MODE FOR CARRYING OUT THE INVENTION

Figure 1:
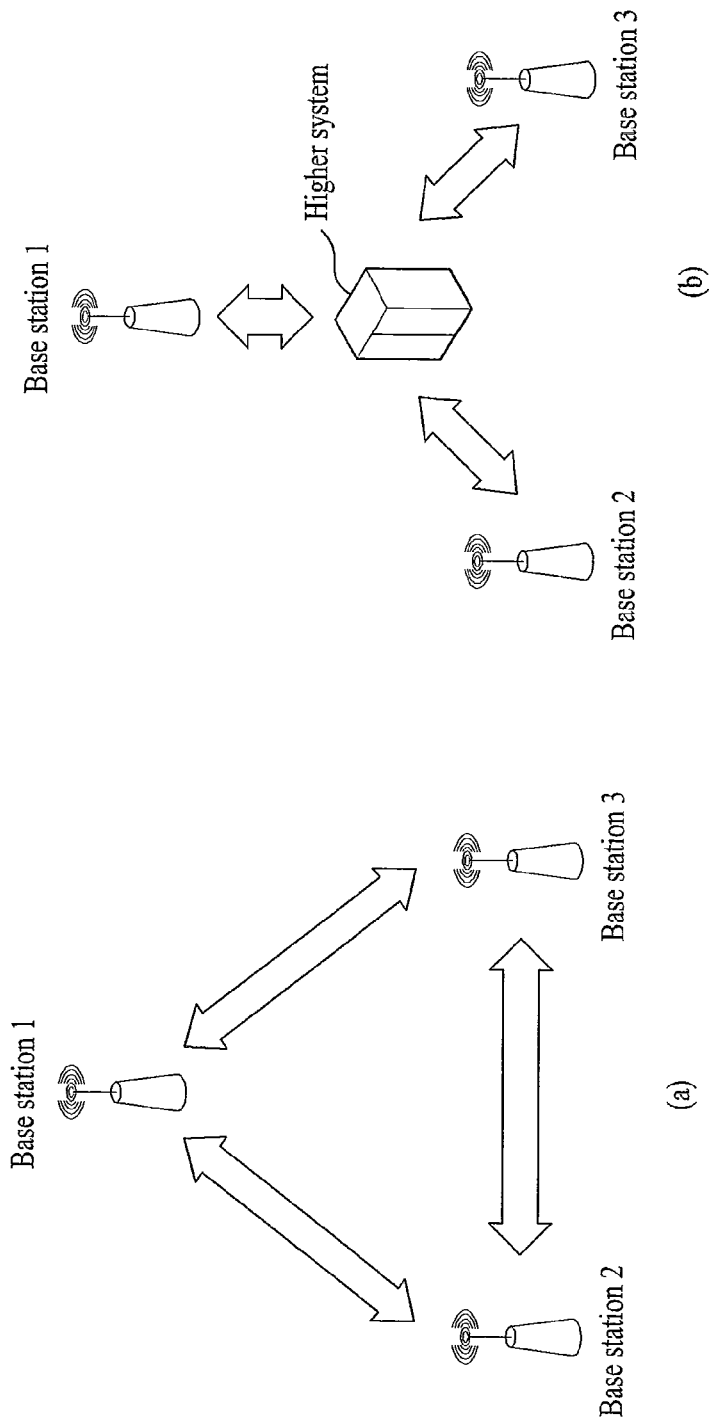
FIG. 1 illustrates a scheme of exchanging information including average transmission rates of BSs in a cooperative unit.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, while the following detailed description includes specific details in order to provide a thorough understanding of the present invention, it will be apparent to those skilled in the art that the present invention may be practiced without such specific details. For example, the following description is given, centering on specific terms, which should not be construed as limiting the present invention. Even though a specific term is replaced with an arbitrary term, they are interchangeably used in the same meaning. The same reference numbers will be used throughout this specification to refer to the same or like parts.

Through the specification, when it is said that some part "includes" a specific element, this means that the part may further include other elements, not excluding them, unless otherwise mentioned.

Technologies described in the following can be used for various communication systems which can provide various communication services such as audio, packet data, etc. The technologies of the communication systems can be used for downlink or uplink. The term used herein, 'Base Station (BS)' may be replaced by 'fixed station', 'Node B', 'eNode B (eNB)', 'access point', 'ABS' or the like. The term 'Mobile station (MS)' may be replaced by 'user equipment (UE)', 'subscriber station (SS)', 'mobile subscriber station (MSS)', 'AMS', 'mobile terminal' or the like.

Furthermore, a transmitting side means a node that transmits data or audio service and a receiver means a node that receives data or audio service. Accordingly, a UE can be a transmitting side and a BS can be a receiver in uplink and the UE can be a receiver and the BS can be a transmitting side in downlink.

In embodiments of the present invention, a UE may use a personal digital assistant (PDD), a cellular phone, a personal communication service (PCS) phone, a global system for mobile (GSM) phone, a wideband CDMA (WCDMA) phone, a mobile broadband system (MBS) phone, etc.

Embodiments of the present invention can be supported by standard documents disclosed for at least one of wireless access systems, that is, an Institute of Electrical and Electronics Engineers (IEEE) 802.16m system, a 3rd Generation Partnership Project (3GPP) system, a 3GPP Long Term Evolution (LTE) system, and a 3GPP2 system. In other words, steps or parts that are not described to clarify the technical spirit of the present invention can be supported by the standard documents. Also, all the phraseology and terminology used herein can be explained by the standard documents. Particularly, embodiments of the present invention can be supported by standard documents of 3GPP and 3GPP2, TS25 and TS36 series and C.S00x series.

In the following description, specific terms are used to help understanding of the present invention and they can be replaced with other terms within the scope and spirit of the present invention.

The term used herein, 'Base Station (BS)' may be called 'cell' or 'sector'. In addition, a higher system corresponds to a system which performs higher functions of each BS and controls transmission of data and control information. In general, the higher system is one network entity. A serving BS (cell) is a BS providing major legacy services to a UE and performs transmission and reception of control information on cooperative multiplex transmission points. In this context, the serving BS may be referred to as an anchor BS (cell).

A description will be given of schemes of controlling power among BSs in a cooperative unit to ensure minimum average transmission rates of UEs in the cooperative unit and maximize proportional fairness.

FIG. 1 illustrates a scheme of exchanging information including average transmission rates of BSs in a cooperative unit.

Referring to FIG. 1, BSs determined to perform cooperation can exchange information through two methods. Referring to FIG. 1A, each BS can directly transmit/receive information received from UEs to/from neighboring BSs through a backbone previously linked between BSs. Referring to FIG. 1B, a higher system that administrates and controls BSs can receive information transmitted to the BSs from UEs from the BSs, process the received information and transmit the processed information to the BSs. Here, an arbitrary BS selected from BSs in the cooperative unit can perform the role of the higher system.

In the former scheme, the BSs can execute a BS cooperative power level control algorithm using the same information since they directly receive information from neighboring cells. In the latter scheme, the higher system receives information from the BSs in the cooperative unit and performs the BS cooperative power level control algorithm using the received information.

While the former scheme has an advantage that the BSs can rapidly acquire information on neighboring cells, the BSs perform the same cell power level determination algorithm to result in a load applied to each BS.

Conversely, the latter scheme can reduce the load of each BS because each BS transmits information thereof to the higher system and receives only power information determined by the higher system without directly receiving information about neighboring cells. However, this scheme requires a longer time to calculate a final power level than the former scheme. Since both the two schemes have strengths and weaknesses, one of them can be selected and used according to communication and system states.

When BSs exchange information as in the former scheme, the BSs in the cooperative unit can perform a BS cooperative power level control operation. Otherwise, an arbitrary one of the BSs in the cooperative unit can carry out the BS cooperative power level control operation. In this case, the BS which performs the BS cooperative power level control operation can inform the other BSs in the cooperative unit of the result of the power level control operation through signaling.

When BSs exchange information as in the latter scheme, the higher system instead of the BSs can perform BS cooperative power level control. Here, the higher system carries out the BS cooperative power level control as does each BS.

A description will be given of the BS cooperative power level control operation performed by each BS or an arbitrary BS in a cooperative unit on the basis of the former scheme. The BS cooperative power level control operation executed by the higher system corresponds to the BS cooperative power level control operation performed by a BS, and thus explanation thereof is omitted.

In an embodiment of the invention, BSs in a cooperative unit can be newly configured according to a predetermined interval of determination of the cooperative unit. That is, the cooperative unit which will perform BS cooperative operations can be determined according to the cooperative unit determination interval. BSs in the cooperative unit, determined in this manner, can exchange information.

Figure 2:
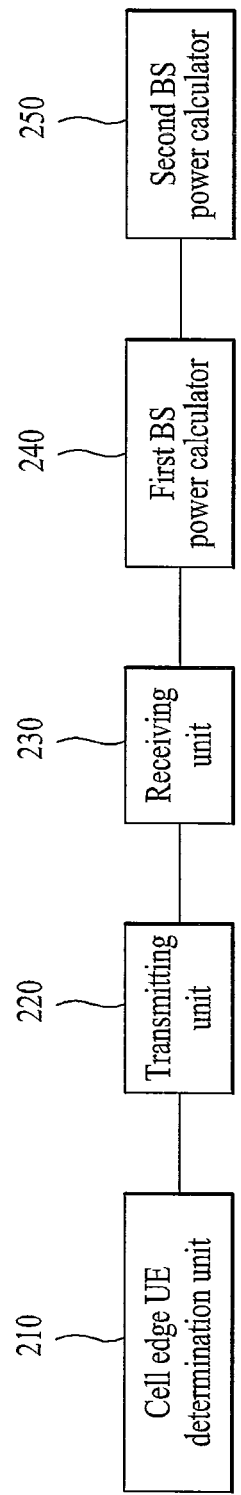
FIG. 2 is a block diagram of a BS device which performs BS cooperative power level control according to an embodiment of the present invention.

FIG. 2 is a block diagram of a BS device which performs BS cooperative power level control according to an embodiment of the present invention.

Referring to FIG. 2, the BS device which performs BS cooperative power level control according to an embodiment of the present invention includes a cell edge UE determination unit 210, a transmitting unit 220, a receiving unit 230, a first BS power calculator 240, and a second BS power calculator 250.

The cell edge UE determination unit 210 selects one UE from each cell when BSs share information. Cell edge UEs can be grouped as a set UE. It is possible to remarkably reduce data traffic through a backbone by using a scheme of selecting one of UEs located on a cell edge.

The cell edge UE determination unit 210 can select a cell edge UE under the control of the BS using the BS device within a BS cooperation interval. Here, a cell edge UE selection interval may include an interval of exchange information between cells. A BS information exchange interval may include one frame or a plurality of frames. In other words, upon determination of the BS cooperative unit, a cell edge UE can be selected many times at the request of cooperative BSs in the cell edge UE selection interval and information about selected cell edge UEs can be transmitted and received at every interval including one or more frames.

A BS cooperative power control method according to an embodiment of the invention, which will be described below, can be performed using the same interval as the BS information exchange interval. It is assumed that the cooperative unit is previously determined and BSs have shared their information.

A description will be given of a cell edge UE selection criterion of a BS.

Firstly, the cell edge UE determination unit 210 can select a UE having the minimum average channel value from a serving BS. A cell edge UE selection criterion of a BS b can be represented by mathematical expression 1.

$$k^* = \operatorname*{argmin}_{k} |h_{b,k}(t)|^2, k \in U_b \quad \text{[Mathematical expression 1]}$$

Here, $|h_{b,k}(t)|^2$ is an average channel value between the BS b and a k-th UE of the BS b and $U_b$ represents a set of UEs provided with services from the BS b.

Secondly, the cell edge UE determination unit 210 can select a UE having a largest sum of interferences as a cell edge UE. This scheme is based on the assumption that BSs in the cooperative unit exchange and share channel information in advance. The cell edge UE selection criterion of the BS b can be represented by mathematical expression 2.

$$k^* = \operatorname*{argmin}_{k} \sum_{b' \in c, b' \neq b} |h_{b',k}(t)|^2, \quad \text{[Mathematical expression 2]}$$
$$k \in U_b$$

Here, c denotes a set of BSs in the cooperative unit.

Thirdly, the cell edge UE determination unit 210 can select a UE having a minimum average transmission rate as a cell edge UE. In this case, the cell edge UE selection criterion of the BS b can be represented by mathematical expression 3.

$$k^* = \operatorname*{argmin}_{k} R_{b,k}(t), k \in U_b \quad \text{[Mathematical expression 3]}$$

Here, $R_{b,k}(t)$ is an average transmission rate of the k-th UE of the BS b.

Fourthly, the cell edge UE determination unit 210 can select a UE having a maximum token value as a cell edge UE. In this case, the cell edge UE selection criterion of the BS b can be represented by mathematical expression 4.

$$k^* = \operatorname*{argmin}_{k} T_{b,k}(t), k \in U_b \quad \text{[Mathematical expression 4]}$$

The transmitting unit 220 can directly transmit the average transmission rate of the cell edge UE of each BS, determined by one of the above-described methods, a token value indicating an up-to-date level of satisfaction of the minimum verge transmission rate of the cell edge UE, and the current BS power level to other BSs in the cooperative unit.

The receiving unit 230 can receive the average transmission rate and the token value from the cell edge UE of the BS using the BS device. In addition, the receiving unit 230 can receive information including the average transmission rate and token value of one cell edge UE of each of the other BSs in the cooperative unit and the current power level of each BS from the other BSs.

The first BS power calculator 240 can calculate a power level vector of each BS in the cooperative unit, which satisfies the minimum average transmission rate of the cell edge UE of each BS and proportional fairness. That is, when the BSs in the cooperative unit have shared cell information, the first BS power calculator 240 finds the power level $\overline{P}$ that satisfies the minimum average transmission rate of the cell edge UE and proportional fairness of cell edge UEs. The power level $\overline{P}$ is a vector value that satisfies the metric of mathematical expression 5.

[Mathematical expression 5]

$$\max_{\overline{P}} \left[ \sum_{b \in c} \log R_{b,k}(t+1), k \in U_b \cap U_E \right] =$$

-continued $$\max_{\overline{P}} \left[ \sum_{b \in c} \log\left( \left(1 - \frac{1}{t}\right) e^{-aT_{b,k}(t)} R_{b,k}(t) + \frac{1}{t} \log\left(1 + \frac{\overline{P}_{b,k}(t)|h_{b,k}(t)|^2}{N_0 + \sum_{b' \in c, b' \neq b} \overline{P}_{b',k}|h_{b',k}(t)|^2}\right) \right) \right], k \in U_b \cap U_E$$

subject to $R_{b,k}(t+1) \geq R_{min}$, $\forall b \in c$, $\forall k \in U_b \cap U_E$ $0 \leq P_{b,k}(t) \leq P_{max}$, $\forall b \in c$, $\forall k \in U_b \cap U_E$

[001.05]

Here, $R_{b,k}(t)$ is the average transmission rate of the k-th UE of the BS b, $|h_{b,k}(t)|^2$ is the average channel value between the BS b and the k-th UE of the BS b, $U_b$, represents a set of UEs provided with services from the BS b, $U_E$ denotes a set of cell edge UEs, a is a token weight function, $T_{b,k}(t)$ is a token value of the k-th UE of the BS b, $P_{max}$ is maximum transmit power of each BS, $N_0$ is an average power of noise, and Rmin is the minimum average transmission rate.

The first BS power calculator 240 can find the power level $\overline{P}$ of each BS, which satisfies mathematical expression 5, using the following method.

The first BS power calculator 240 divides the maximum power into a plurality of test power levels for the respective BSs, as represented by $\overline{P}_{b,k}(t) \in \{0, P_{max}/(N_P-1), 2P_{max}/(N_P-1), \ldots, P_{max}\}$ where $N_P$ is the number of test power levels. The first BS power calculator 240 can select one of the plurality of test power levels for each BS and check whether the test power level for each BS satisfies mathematical expression 5. The first BS power calculator 240 can check whether all combinations of test power levels for the BSs satisfy mathematical expression 5 and detect a combination of power levels $\overline{P}$, which maximizes the metric of mathematical expression 5, from combinations of test power levels, which satisfy mathematical expression 5.

A time and calculation complexity required to find the combinations of test power levels, which satisfy mathematical expression 5, increase as $N_P$ increases. However, when $N_P$ is set to too small, an optimum combination of test power levels, which satisfies mathematical expression 5, may not be detected. Accordingly, it is desirable that $N_P$ is set to an appropriate value considering calculation complexity and optimum power.

A token value is a concept adopted by a system which performs proportional fairness scheduling. Token values are imparted to UEs in order to meet minimum average transmission rates of the UEs and the token value of each UE is increased by a level of dissatisfaction of the minimum average transmission rate of each UE. Then, increased token values of UEs whose minimum average transmission rates are not satisfied are reflected in scheduling to give priority to the UEs. Accordingly, it is possible to control minimum average transmission rate conditions of UEs within a possible extent.

The token value of the k-th UE of the BS b can be updated using the following mathematical expression 6.

$T_{b,k}(t+1) = \max\{0, T_{b,k}(t) + R_{min} - r_{b,k}(t)\}$ [Mathematical expression 6]

Here, Rmin represents the minimum average transmission rate, $|h_{b,k}(t)|^2$ denotes the average channel value between the BS b and the k-th UE of the BS b, $r_{b,k}(t)$ an instantaneous transmission rate at time t, which can be represented by mathematical expression 7.

$$r_{b,k}(t) = \log\left(1 + \frac{\overline{P}_{b,k}(t)|h_{b,k}(t)|^2}{N_0 + \sum_{b' \in c, b' \neq b} \overline{P}_{b',k}(t)|h_{b',k}(t)|^2}\right)$$ [Mathematical expression 7]

If the BS power level $\overline{P}$ that meets Mathematical expression 5 for BS power control is present, the second BS power calculator 250 can calculate a new BS power level, as represented by mathematical expression 8, in consideration of the current power level and the BS power level $\overline{P}$ that satisfies mathematical expression 5. The second BS power calculator 250 can update the BS power level into the calculated Bs power level.

$\overline{P}(t+1) = \min(P_{max}, \max(0, \overline{P}(t) + \beta(\overline{P} - \overline{P}(t))))$ [Mathematical expression 8]

Here, $\overline{P}(t)$ represents the current BS power level, $\overline{P}(t+1)$ denotes the new BS power level, and $\beta$ is a power control constant. $\beta$ is a value that can be determined according to a given condition. For example, $\beta$ is set to a larger value if faster satisfying BS fairness takes priority over meeting the minimum average transmission rates of UEs. Conversely, $\beta$ is set to a smaller value to finely control power levels of BSs so as to satisfy the minimum average transmission rates of the UEs if the average rates of the UEs are largely varied according to a small change of the power levels of the BSs.

If the power level $\overline{P}$ that meets mathematical expression 5 is not present, the first BS power calculator 240 can detect $\overline{P}$ again through the following process. That is, the first BS power calculator 240 can use a method of temporarily excluding a cell including a UE having the minimum token value from the cooperative unit. Mathematical expression 9 represents the cell to which the UE having the minimum token value belongs.

$$b_{low} = \operatorname*{argmin}_{b}[T_{b,k}(t)],$$ [Mathematical expression 9]

$k \in U_b \cap U_E$

Mathematical expression 10 represents a set of BSs in the cooperative unit from which the cell including the UE having the minimum token value has been excluded.

$c = c - \{b_{low}\}$ [Mathematical expression 10]

The first BS power calculator 240 finds $\overline{P}$ for the BSs in the cooperative unit from which the cell including the UE having the minimum token value has been temporarily excluded using mathematical expression 5. The first BS power calculator 240 can repeat this process until $\overline{P}$ is detected. A cell having a minimum token value is selected and excluded in order to satisfy proportional fairness more by considering cells in a poor transmission state prior to cells in a good transmission state. When the above process is performed until only one cell remains, there is no need to consider interference between neighboring cells. At this time, the BS maximum power $P_{max}$ can be the optimum power.

Figure 3:
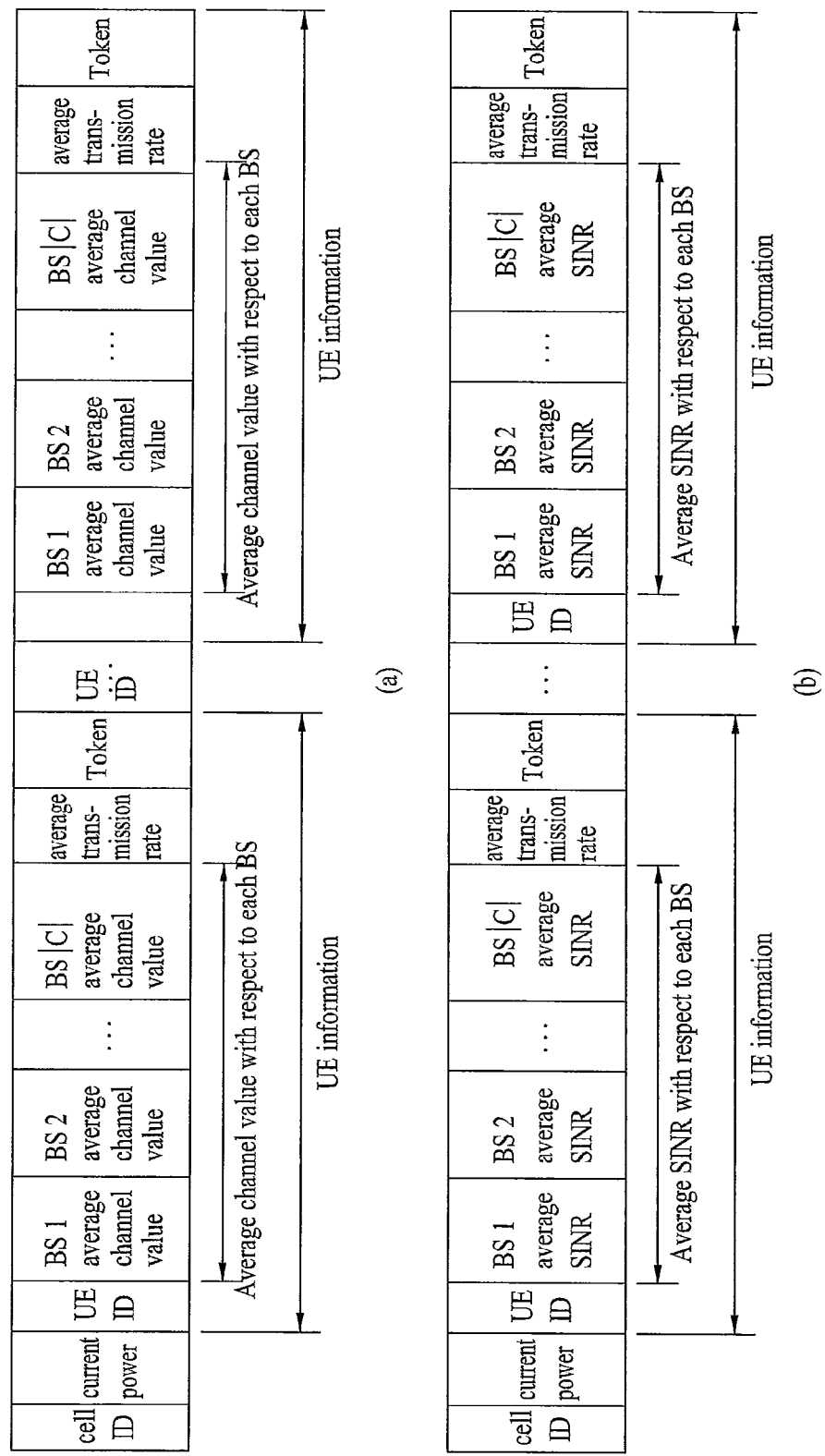
FIG. 3 illustrates configurations of packet data transmitting information which is exchanged between BSs in a cooperative unit.

FIG. 3 illustrates configurations of packet data transmitting information which is exchanged between BSs in a cooperative unit.

Referring to FIG. 3, packet data is configured through a first packet data configuration scheme in which a BS estimates information corresponding to average channel values of UEs belonging to the BS in advance and transmits the estimated average channel values to configure packet data, and a second packet data configuration scheme in which average signal interference-to-noise ratios (SINRs) of UEs belonging to each BS are transmitted to configure packet data.

In both the two cases, a cell identification (ID) can be assigned to the beginning of a packet. Each cell in a cellular system has its own cell ID, and thus cell ID information is used for an information receiving part to identify a cell that transmits information corresponding to the cell ID information. In addition, the packet can be allocated a current power level used by a BS including the corresponding cell, average channel values or average SINRs of each UE with respect to BSs in a cooperative unit before the BSs transmit data, average transmission rates, token values, etc. Here, |C| represents the total number of BSs that constitute the cooperative unit C. The packet data can be directly transmitted to a neighboring cell according to a neighboring cell information exchange scheme or transmitted to a higher system.

Figure 4:
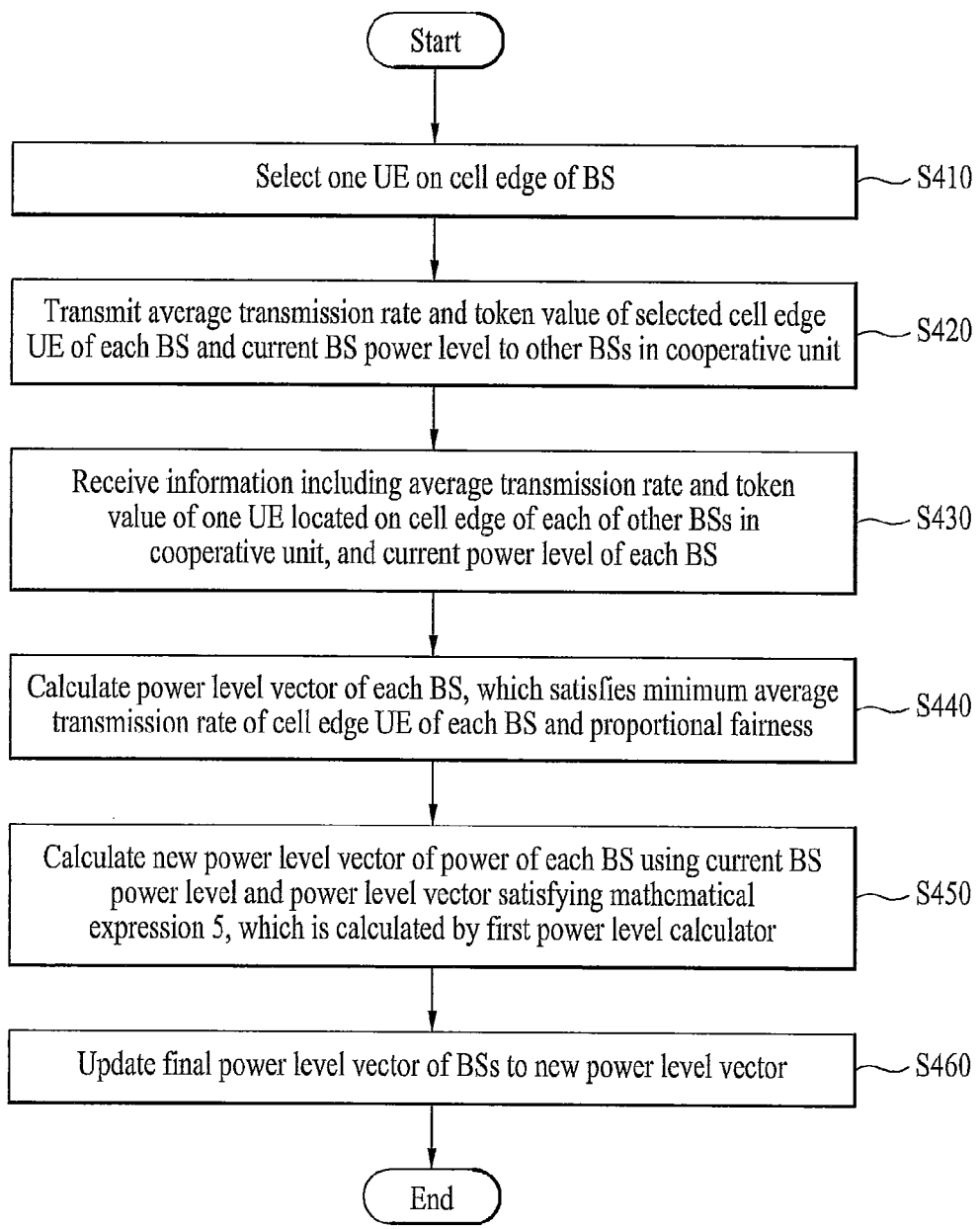
FIG. 4 is a flowchart illustrating a BS cooperative power level control method according to an embodiment of the present invention.

FIG. 4 is a flowchart illustrating a BS cooperative power level control method according to an embodiment of the present invention.

Referring to FIG. 4, the cell edge UE determination unit 210 selects one UE located on the cell edge of the BS using the BS device (S410). As described above, the cell edge UE determination unit 210 can select one of a UE having a minimum channel value with respect to a serving BS, a UE having a largest sum of interferences, a UE having a minimum average transmission rate, and a UE having a maximum token value as the UE located on the call edge of the BS in the cooperative unit (S410). The cell edge UEs can be grouped as a set $U_E$. Data traffic through a backbone can be reduced by using a method of receiving information including the average transmission rate and the token value of the cell edge UE selected as above to thereby prevent the backbone from overload.

The transmitting unit 220 can transmit the average transmission rate of the selected cell edge UE of the corresponding BS, the token value indicating an up-to-date level of satisfaction of the minimum average transmission rate of the UE, and the current BS power level to other BS in the cooperative unit (S420).

The receiving unit 230 can receive information including the average transmission rate and token value of one cell edge UE of each of other BSs in the cooperative unit and the current power level of each BS from the other BSs in the cooperative unit (S430).

The first BS power calculator 240 can calculate a power level vector of the corresponding BS in the cooperative unit, which meets the minimum average transmission rate of the cell edge UE of the BS and proportional fairness (S440). Specifically, if the BSs in the cooperative unit have shared cell information, the first BS power calculator 240 finds the power level vector $\overline{P}$ which satisfies the minimum average transmission rate of the cell edge UE of the corresponding BS and proportional fairness of cell edge users (UEs). The power level vector $\overline{P}$ is a vector value satisfying mathematical expression 5.

The second BS power calculator 250 can calculate a new power level vector of the corresponding BS using the current power level of the BS and the power level vector calculated by the first BS power calculator 240, which meets mathematical expression 5 (S450). Then, the second BS power calculator 250 can set the new power level vector of the BS to a second power level vector to be used by the BS (S460).

The BS can transmit information on at least one of the calculated first power level vector calculated by the first BS power calculator 240 and the second power level vector to another BS in the cooperative unit.

Figure 5:
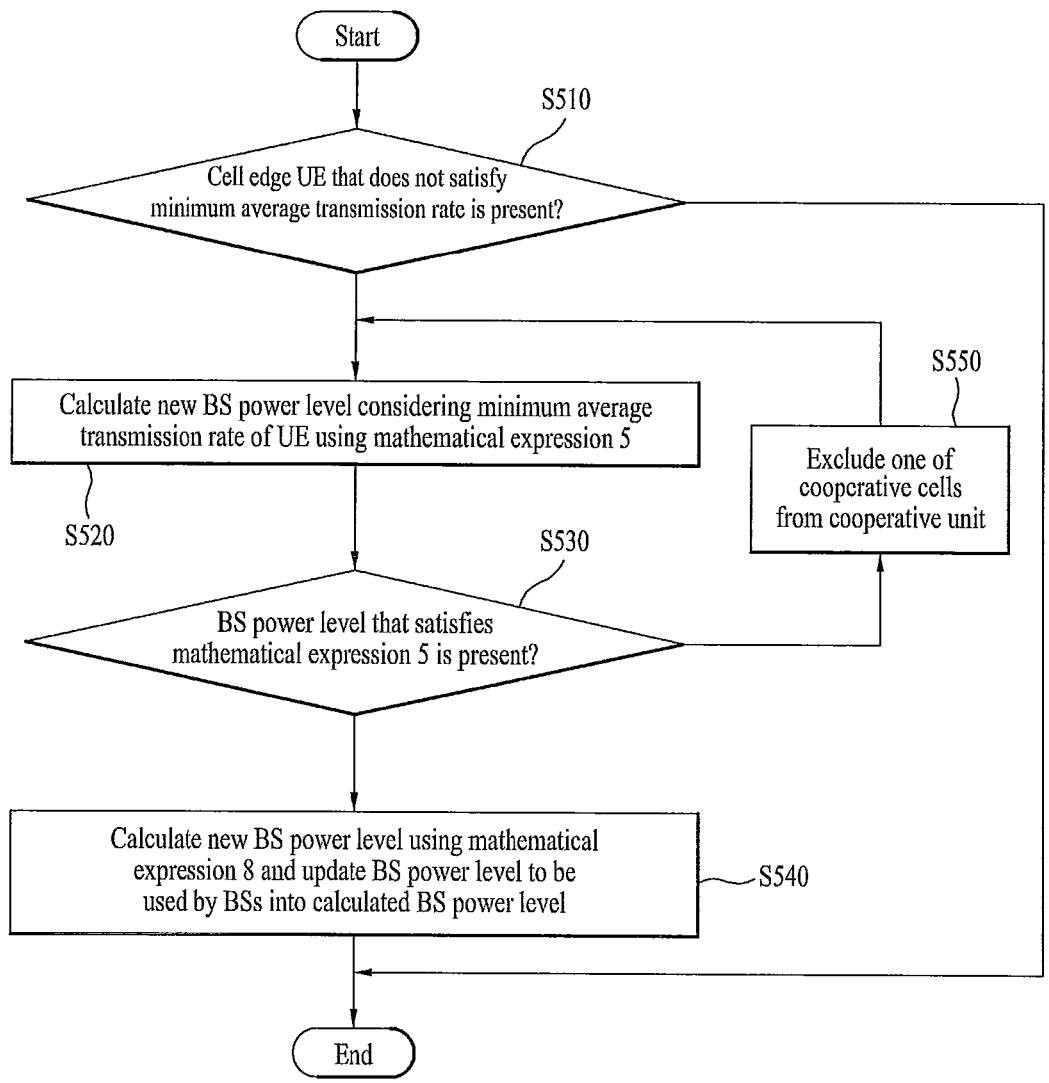
FIG. 5 is a flowchart illustrating an exemplary algorithm for controlling a BS cooperative power level according to an embodiment of the present invention.

FIG. 5 is a flowchart illustrating an exemplary algorithm for controlling a BS cooperative power level according to an embodiment of the present invention.

Referring to FIG. 5, a BS can determine whether a cell edge UE whose minimum average transmission rate is not satisfied is present (S510). That is, the BS can determine whether to change the current power level thereof. Here, the BS checks if the average transmission rate of each UE meets the minimum average rate. The current power level of the BS is maintained if the average transmission rates of all cell edge UEs meet the minimum average rate. Conversely, the current power level of the BS needs to be changed if the average transmission rate of any of the cell edge UEs cannot satisfy the minimum average transmission rate.

The first BS power calculator 240 can calculate a BS power level that satisfies the minimum average transmission rate of the UE using mathematical expression 5 (S520). Then, the first BS power calculator 240 can determine whether a BS power level satisfying mathematical expression 5 is present (S530).

If there is a power level which satisfies the minimum average transmission rates of all the cell edge UEs, the second BS power calculator 250 can calculate a new BS power level using mathematical expression 8 and set the new BS power level to a BS power level which will be used by the BSs in the cooperative unit (S540). Conversely, if there is no power level which satisfies the minimum average transmission rates of all the cell edge UEs, one of cooperative cells is dropped and a third power level vector corresponding to an optimum BS power level can be calculated using information about BSs from which the dropped cell is excluded (S550).

Upon completion of the above procedure with only one cell left, the BS maximum power level can be an optimum power level since there is no need to consider inter-cell interference. The BS can transmit information on the third power level vector to another BS in the cooperative unit.

Each BS can perform proportional fairness scheduling and select UEs to be provided with services using BS power information calculated through the aforementioned procedure in consideration of power allocated thereto and power of neighboring BSs. In other words, cooperative BSs can determine a BS power level considering a cell edge UE and perform scheduling using the BS power level in consideration of inter-cell interference.

The BS power control algorithm for a minimum average transmission rate in a single subchannel has been described. A description will be given of a BS power control algorithm in multiple subchannels.

In general, a BS can use a plurality of subchannels. Power that can be used for the plurality of subchannels is limited to below the maximum BS power. Accordingly, power left after one subchannel uses allocated power can be used for the next subchannel. It is assumed that power corresponding to maximum power $P_{max}$ is assigned to each subchannel. If one of multiple subchannels uses power lower than maximum power assigned thereto, the remaining power can be added to the maximum power $P_{max}$ assigned to the next subchannel such that the next subchannel can use power higher than the maximum power $P_{max}$ allocated thereto.

Figure 6:
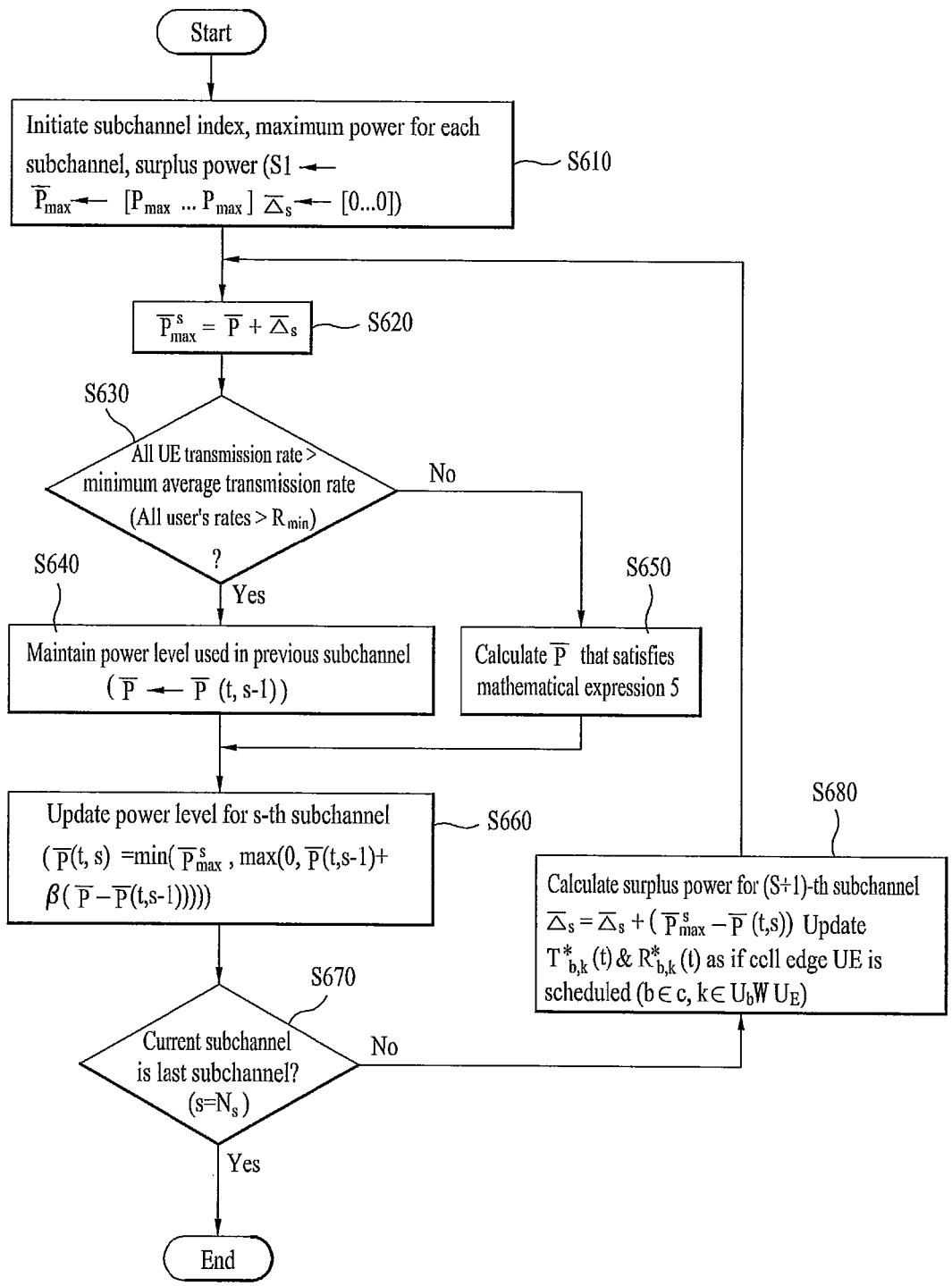
FIG. 6 is a flowchart illustrating an exemplary BS power control algorithm for a minimum average transmission rate in multiple subchannels, which is extended from a BS power control algorithm for a minimum average transmission rate in a single subchannel.

FIG. 6 is a flowchart illustrating an exemplary BS power control algorithm for a minimum average transmission rate in multiple subchannels, which is extended from the BS power control algorithm for a minimum average transmission rate in a single subchannel.

Referring to FIG. 6, maximum power of each subchannel is initiated to $P_{max}$ and surplus power of each subchannel is initiated to 0, that is, s=1,$\overline{P}_{max}=[P_{max} \ldots P_{max}]$,$\overline{\Delta}_s=[0 \ldots 0]$, ∀s (S610). Here, s is a subchannel index, $\overline{P}_{max}$ is a vector indicating maximum power of each BS in the cooperative unit, and $\overline{\Delta}_s$ is a surplus power vector of each BS, which can be used for an s-th subchannel.

Remaining power unused in an (s−1)th subchannel can be added to the power that has been allocated to the s-th subchannel to obtain available maximum power of the s-th subchannel (S620). The available maximum power can be represented as mathematical expression 11.

$$\overline{P}_{max}{}^s = \overline{P}_{max} + \overline{\Delta}_s \quad \text{[Mathematical expression 11]}$$

Here, $\overline{P}_{max}{}^s$ represents an available maximum power level of the s-th subchannel.

The BSs in the cooperative unit determine whether average transmission rates of cell edge UEs thereof meet the minimum average transmission rate (S630). The current power is maintained as power used for the previous subchannel ($\overline{P} \leftarrow \overline{P}(t,s-1)$) if the average transmission rates of the cell edge UEs meet the minimum average transmission rate (S640). $\overline{P}$ satisfying mathematical expression 5 is obtained if the average transmission rates of the cell edge UEs do not meet the minimum average transmission rate (S650). It is assumed that $\overline{P}(t,0)$ used when the subchannel index is 1 is a power value of each BS, which was used for the last NS-th subchannel at the previous time. That is, a power level for the s-th subchannel at time t can be updated using mathematical expression 12 (S660).

$$\overline{P}(t,s) = \min(\overline{P}_{max}{}^s, \max(0, \overline{P}(t,s-1) + \beta(\overline{P} - \overline{P}(t,s-1)))) \quad \text{[Mathematical expression 12]}$$

If the current subchannel is not the last subchannel after update of the power level (S607), the above procedure can be repeated to set power for the next subchannel of each BS. Surplus power for the next subchannel can be calculated by mathematical expression 13.

$$\overline{\Delta}_s = \overline{\Delta}_s + (\overline{P}_{max}{}^s - \overline{P}(t,s)) \quad \text{[Mathematical expression 13]}$$

When mathematical expression 5 is applied to the next subchannel, the token value and average transmission rate corresponding to the next subchannel need to be updated. A token value and average transmission rate for multiple subchannels are updated according to two systems. One of the systems is a proportional fair scheduling-single carrier system (PFS-S) which uses a token value and average transmission rate used for a previous frame without updating since it is impossible to be aware of which one of cell edge UEs is selected. The other is a proportional fair scheduling-instantaneous (PFS-I) system which updates token values and average transmission rates of cell edge UEs of respective BSs on the assumption that the cell edge UEs of the BSs are respectively selected.

In the PFS-I system, upon calculation of power for each subchannel according to mathematical expression 14, update of the token value $T^*_{b,k}(t)$ and average transmission rate $R^*_{b,k}(t)$ of the cell edge UE at time t for the above-mentioned algorithm can be calculated according to mathematical expressions 15 and 16.

$$r^*_{b,k}(t,s) = \quad \text{[Mathematical expression 14]}$$
$$\log\left(1 + \frac{\overline{P}_{b,k}(t,s)|h_{b,k}(t)|^2}{N_0 + \sum_{b' \in c, b' \neq b} \overline{P}_{b',k}(t,s)|h_{b',k}(t)|^2}\right)$$

Here, $r^*_{b,k}(t,s)$ is an instantaneous transmission rate of the s-th subchannel at time t and $|h_{b,k}(t)|^2$ is an average channel value between the BS b and the k-th UE of the BS b at time t.

$$T^*_{b,k}(t,s+1) = \quad \text{[Mathematical expression 15]}$$
$$\max\{0, T^*_{b,k}(t,s) + R_{min} - r^*_{b,k}(t,s)\}$$

$$R^*_{b,k}(t,s+1) = \quad \text{[Mathematical expression 16]}$$
$$\left(1 - \frac{1}{t}\right)R^*_{b,k}(t,s) + \frac{1}{tN_s}r^*_{b,k}(t,s)$$

Here, $\overline{P}(t,s)$ is the power level of the s-th subchannel at time t and NS is the number of subchannels.

Update of a token value and an average transmission rate in the PFS-S system corresponds to the updating scheme for the single subchannel so that explanation thereof is omitted.

The concept of multi-subchannel is parallel to the concept of sub-band in orthogonal frequency division multiplexing (OFDM). In an OFDM system, each UE data can be divided into subchannels and transmitted and the sum of powers respectively assigned to the subchannels can be determined not to exceed the maximum power of each BS.

In the OFDM system, power left over after applying the BS power control algorithm to each subchannel can be used to increase the maximum power of the next subchannel. Consequently, the BS power control algorithm can be performed more effectively in OFDM corresponding to a multi-channel environment.

Figure 7:
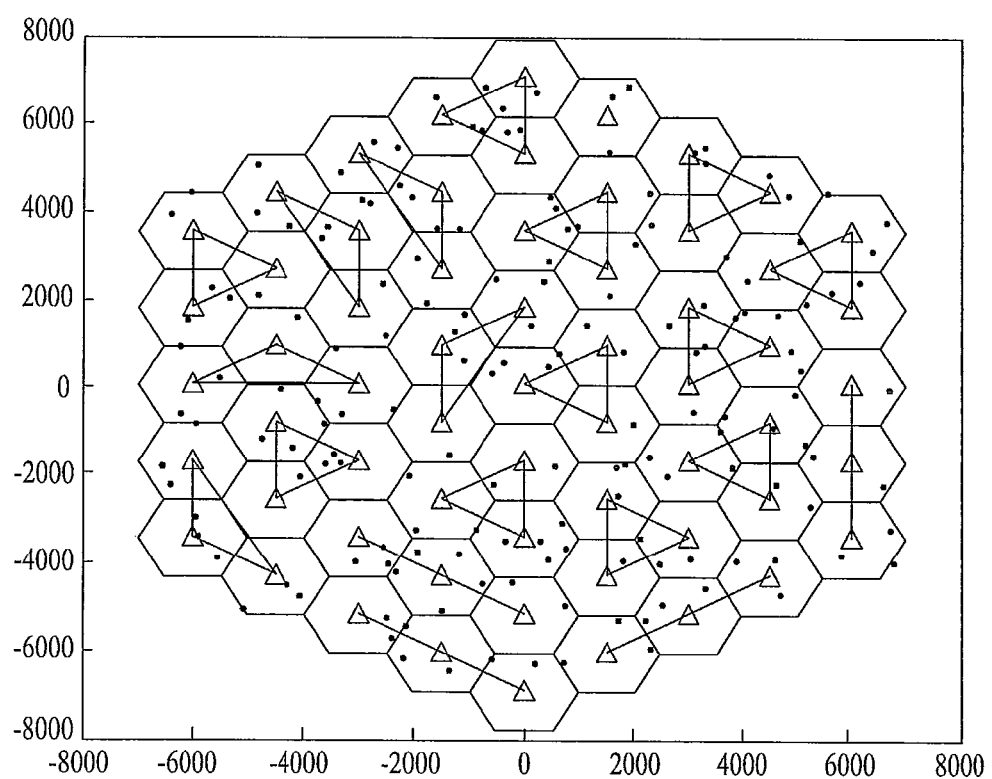
FIG. 7 illustrates BSs and UEs in a cooperative unit to execute the BS cooperative power level control algorithm according to an embodiment of the present invention.

FIG. 7 illustrates BSs and UEs in a cooperative unit to execute the BS cooperative power level control algorithm according to an embodiment of the present invention.

Referring to FIG. 7, experimental setup is assumed to be a downlink multiplex cellular wireless communication network including 4 tiers, that is, 61 cells. Further, it is assumed that one BS is located at the center of each cell, three users (UEs) per cell are uniformly distributed in the area of each cell, and all users wait to receive services. A path fading index η of a signal uses 4, the radius Db of a cell is 1 km, a signal average SNR $\rho_b$ for the outermost UE of a cell is defined as $\rho_b = D_b^{-4} P_{max}/N_0$ for the maximum BS power $P_{max}$, and power of each BS is set such that $\rho_b$ corresponds to 10 dB.

Furthermore, 'S-RRM' scheme in which each BS provides services to UEs with a BS power level consistently set to a maximum power level $P_{max}$ without performing cell cooperation, that is, without considering neighboring cells, and 'optimal-cooperative radio resource management (O-CRRM)' scheme which obtains a combination of optimum UEs which can maximize the result of the following mathematical expression 17 and a combination of power levels corresponding thereto so as to obtain maximum proportional fairness among cells are experimented and compared with the BS power control algorithm according to the invention to demonstrate the effectiveness of the BS power control algorithm of the invention.

The 'O-CRRM' scheme is experimented using a mathematical expression quoted in "proportional fair scheduling for OFDMA wireless systems with QOS constraints" of U.S. Pat. No. US 2007/0248048 applied by C. Zhu, T. Girici, and J. Russell A. Mathematical expression 17 relates to scheduling for maximizing the sum of average transmission rates of UEs.

[Mathematical expression 17]

$$\max_{I,P}\left[\sum_{b \in c}\sum_{k \in U_b} \log R_{b,k}(t+1)\right] =$$

-continued $$\max_{I,P} \left[ \sum_{b \in c} \sum_{k \in U_b} \log\left( \left(1 - \frac{1}{t}\right) e^{-aT_{b,k}(t)} R_{b,k}(t) + \frac{1}{t} \right. \right.$$

$$\left. \left. I_{b,k}(t) \log\left( 1 + \frac{P_{b,k}(t)|h_{b,k}(t)|^2}{N_0 + \sum_{b' \in c, b' \neq b} P_{b',k}(t)|h_{b',k}(t)|^2} \right) \right) \right]$$

subject to $R_{b,k}(t+1) \geq R_{min}$, $\forall b \in c$, $\forall k \in U_b$ $0 \leq P_{b,k}(t) \leq P_{max}$, $\forall b \in c$, $\forall k \in U_b$ $\sum_{k \in U_b} I_{b,k}(t) = 1$, $\forall b \in c$ $I_{b,k}(t) \in \{0, 1\}$ $\forall b \in c$, $\forall k \in U_b$ Here, $I_{b,k}(t)$ is an indicator which indicates whether the k-th UE of the BS b is scheduled at time t. $I_{b,k}(t)$ is 1 when the k-th UE is scheduled and 0 when it is not.

Mathematical expression 5 proposed in the present invention remarkably reduces the complexity of mathematical expression 17 and is required to perform BS power control for satisfying the minimum average transmission rate considering inter-cell interference.

The effectiveness of the present invention was measured by using an average transmission rate (bps/Hz) of each UE and obtaining a cumulative distribution function (CDF) based on a downlink multiplex cellular wireless communication network model which will be described below.

Here, NP used to find a power level that meets mathematical expression 5 is set to 4 and a power updating constant β is set to 0.05 considering accuracy. It is assumed that a cell edge UE selection interval can correspond to a cell cooperation establishment interval and one cell cooperation interval can include a plurality of frame slots. At this time, each BS can exchange information on a cell edge UE thereof with neighboring BSs for every frame. It is assumed that each BS provides services to UEs using a proportional fair scheduler upon determination of a power level thereof after exchange of information for every frame and execution of BS cooperative power level control.

Figure 8:
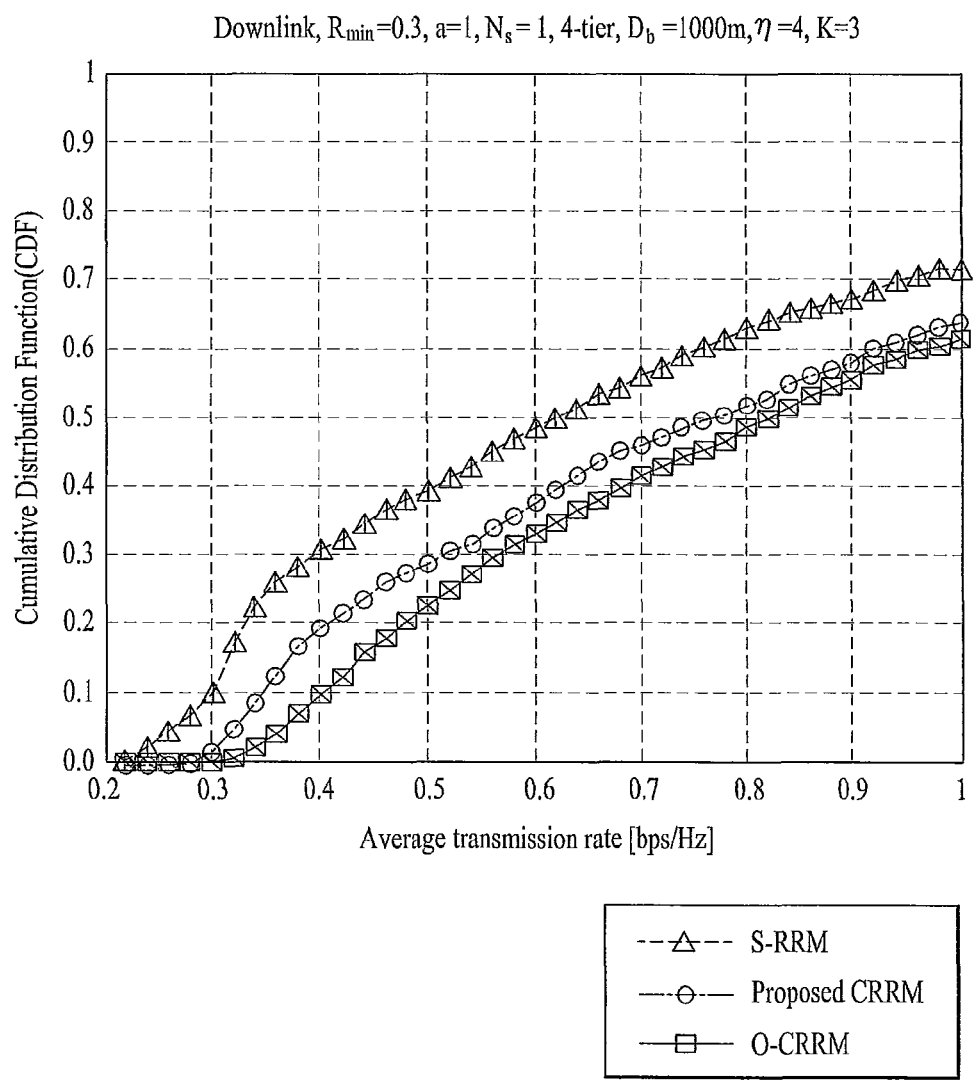
FIG. 8 shows a cumulative distribution function (CDF) with respect to a final average transmission rate in the case of a single subchannel based on a downlink multiplex cellular wireless communication network model.

FIG. 8 shows a cumulative distribution function (CDF) with respect to a final average transmission rate in the case of a single subchannel based on a downlink multiplex cellular wireless communication network model.

A simulation result shown in FIG. 8 is obtained on the assumption that experimental setup is established based on downlink, a single subchannel, and 4 tiers, the minimum average transmission rate $R_{min}$ is 0.3, the signal path fading index η is 4, the radius Db of a cell is 1 km, three users (UEs) are allocated per cell (k=3), and the token weight function is set to a=1.

It can be understood from the simulation result that CRRM ('Proposed CRRM') scheme proposed to apply the BS cooperative power level control algorithm satisfies minimum average transmission rates of all UEs and has the performance that is not much lower than 'O-CRRM' scheme having the best performance in the overall average transmission rate period.

Furthermore, it can be known that the proposed CRRM scheme shows performance much higher than 'S-RRM' scheme which does not perform power control for each BS. In 'S-RRM' scheme, 10% of the UEs do not meet the minimum average transmission rate condition. However, it can be confirmed that the proposed CRRM scheme enables uniform resource distribution for each cooperative unit, satisfactorily meets the minimum average rage and maintains proportional fairness.

In addition, it can be known that the CRRM proposed by the present invention shows considerably high performance considering complexity is remarkably reduced according to BS cooperative power level control taking cell edge UEs into account as compared to 'O-CRRM' scheme.

Figure 9:
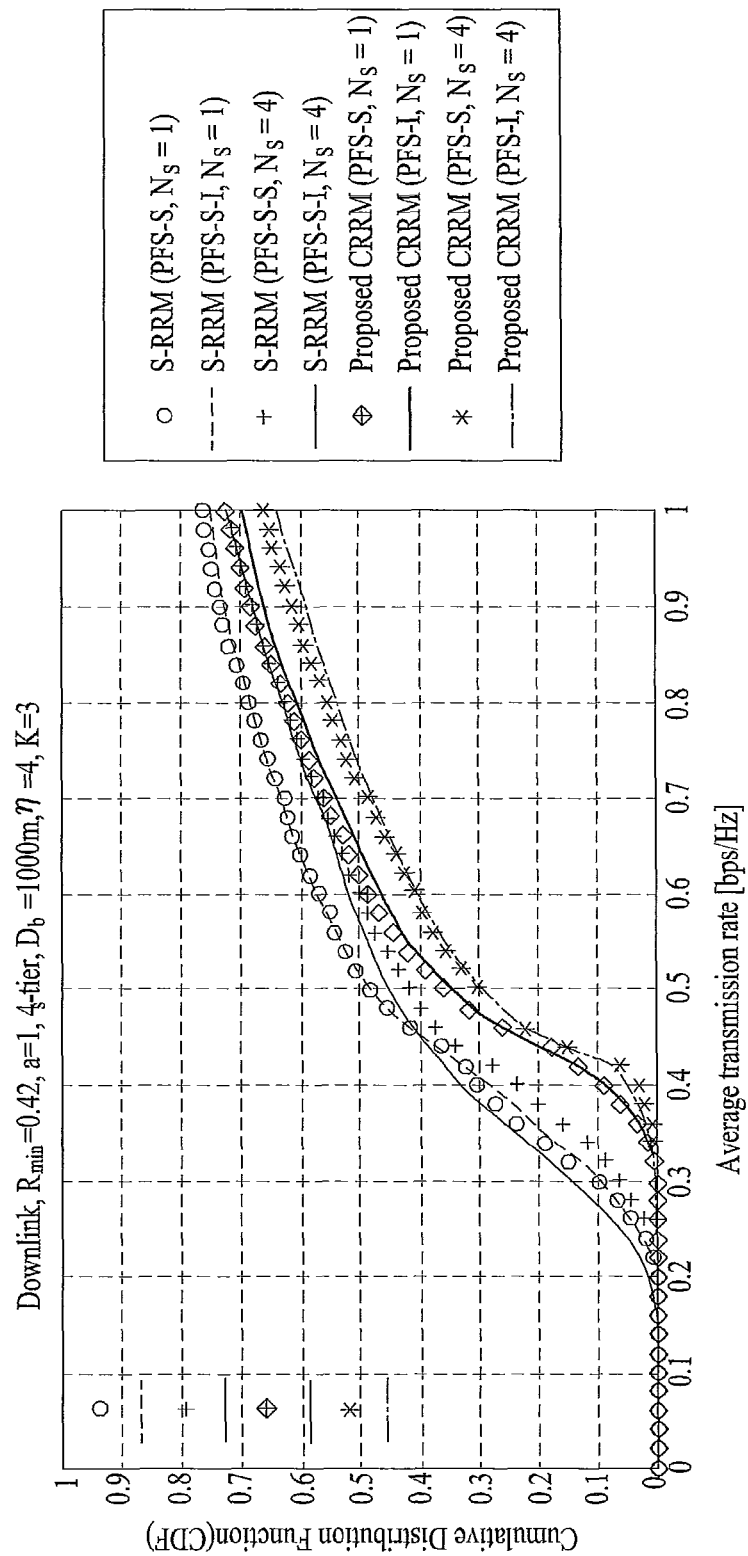
FIG. 9 shows a CDF with respect to a final average transmission rate in the case of multiple subchannels based on the downlink multiplex cellular wireless communication network model.

FIG. 9 shows a CDF with respect to a final average transmission rate in the case of multiple subchannels based on the downlink multiplex cellular wireless communication network model.

A result shown in FIG. 9 is obtained through simulations performed under the condition that experimental setup is established based on downlink, a single subchannel, and 4 tiers, the minimum average transmission rate $R_{min}$ is 0.42 which is higher than that of the simulation of FIG. 8, the signal path fading index η is 4, the radius Db of a cell is 1 km, three users (UEs) are allocated per cell (k=3), and the token weight function is set to a=1.

Referring to FIG. 8, S-RRM is difficult to recognize interference coming from a neighboring cell as the number of subchannels increases to 4 from 1, and thus the performance of FPS-I is deteriorated lower than PFS-S.

Conversely, the CRRM scheme proposed by the present invention shows better performance when the number of subchannels is 4 than when the number of subchannels is 1 since the CRRM scheme performs cell cooperation using interference information coming from a neighboring cell. Therefore, it can be known that the present invention can improve the performance of a wireless cellular system having multiple subchannels such as OFDM as well as the wireless cellular system having a single subchannel.

A description will be given of a cell cooperative radio resource management method.

Figure 10:
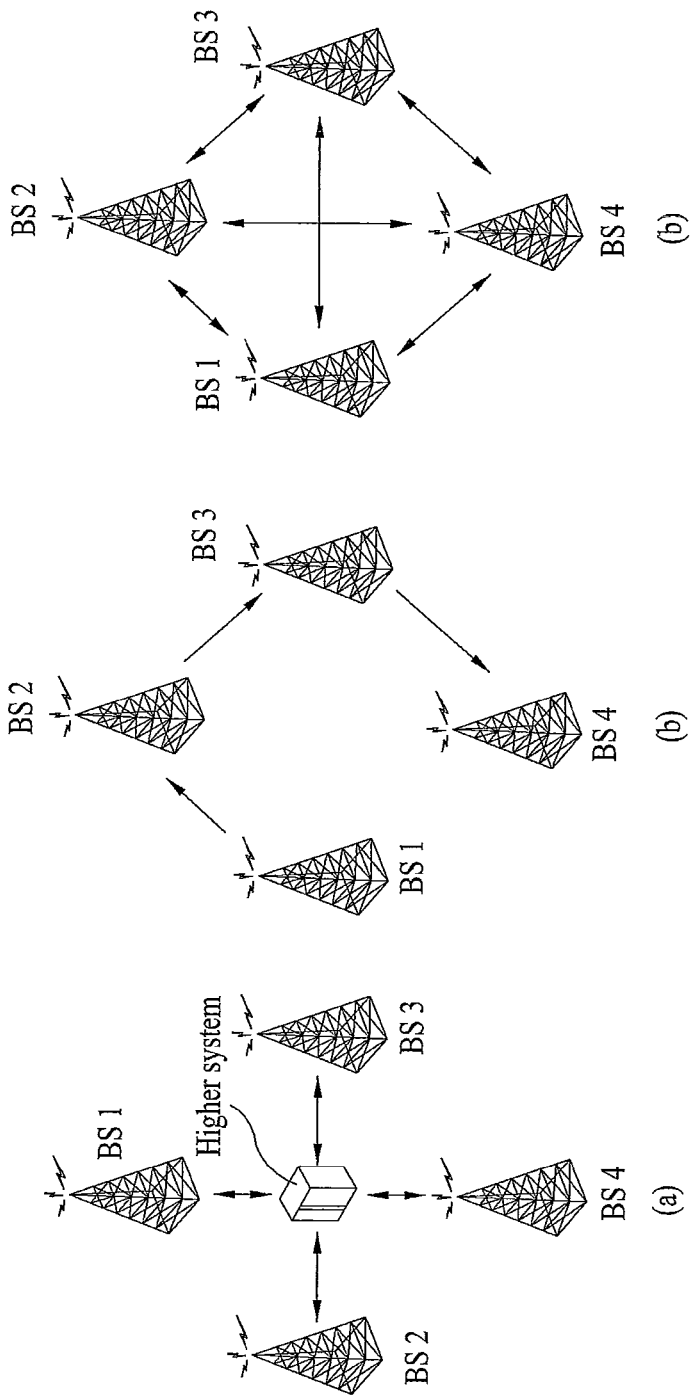
FIG. 10 illustrates an exemplary cell cooperative radio resource management scheme.

FIG. 10 illustrates an exemplary cell cooperative radio resource management scheme.

Referring to FIG. 10, the cell cooperative radio resource management scheme proposed by the present invention can be classified into three. In the first cooperative radio resource management scheme, BSs in a cooperative unit and a higher system linked at a higher layer perform cell cooperative radio resource management. Alternatively, one BS in the cooperative unit may carry out the cell cooperative radio resource management.

The second cell cooperative radio resource management scheme sets an arbitrary order of cells (BSs) in a cooperative unit such that the cells (or BSs) execute radio resource management in the order and transfer execution results to the next cells.

According to the third cell cooperative radio resource management scheme, each cell performs radio resource management considering only UEs belonging thereto primarily, and then exchanges information including the management result and average transmission rates of selected UEs with all other BSs in the cooperative unit such that the cells in the cooperative unit execute radio resource management using the information.

A cell cooperative radio resource management scheme adapted for system and channel states can be selected from the cell cooperative radio resource management schemes. The first cooperative radio resource management scheme is suitable for a case in which the amount of information exchanged for radio resource management, which will be transmitted through a wired network or a wireless network, is relatively small since the number of cells (or BSs) in a cooperative unit or the number of UEs is small, or the amount of information exchanged for cooperative radio resource management and time required therefor are not largely limited. In this case, the best cell cooperative radio resource management result can be obtained although overhead increases since all BSs in the cooperative unit should exchange SNRs received from UEs, average transmission rates of the UEs, and cooperative radio resource management results with the higher system.

The second cooperative radio resource management scheme is suitable for a case in which the amount of information exchanged for radio resource management, which will be transmitted through a wired network or a wireless network, is relatively large since the number of cells (or BSs) in a cooperative unit or the number of UEs is large, or the amount of information exchanged for cooperative radio resource management and time required therefor are considerably limited.

In this case, it is possible to give priority to each cell (BS) in the cooperative unit such that each cell (BS) executes radio resource management according to priority and transfer information including the execution result and average transmission rates of selected UEs to a cell (BS) of the next priority. The second cooperative radio resource management scheme has overhead and complexity lower than those of the first cooperative radio resource management scheme.

The third cooperative radio resource management scheme is configured in such a manner that each cell (BS) in a cooperative unit executes first radio resource management considering only cells (BSs) belonging thereto and exchanges the execution result with all other BSs in the cooperative unit, and then each cell (BS) carries out secondary radio resource management considering the received first radio resource management results of other cells. The third cooperative radio resource management scheme can remarkably decrease overhead required for cell cooperative radio resource management although it produces the radio resource management result slightly deteriorated compared to the best radio resource management result.

An interval of transmission of an SNR of each UE by each BS and an interval of transmission of the current average transmission rate of each UE by each BS can be dynamically determined according to a cooperative radio resource management scheme, system and channel states. While it is desirable that the SNR and average transmission rate transmission intervals are equal to a cooperative radio resource management interval in order to obtain the best performance, the SNR and average rate transmission intervals may be set to be longer than the cooperative radio resource management interval considering the system and channel states in order to reduce overhead involved in radio resource management.

When a channel does not abruptly vary with time, that is, when the channel has low time selectivity, the SNR transmission interval can be increased so as to considerably reduce overhead to achieve performance similar to that obtained with a short SNR transmission interval.

Cooperative radio resource management can be performed by a higher system in the first cooperative radio resource management scheme and carried out by each BS in a cooperative unit in the second cooperative radio resource management scheme and the third cooperative radio resource management scheme.

Figure 11:
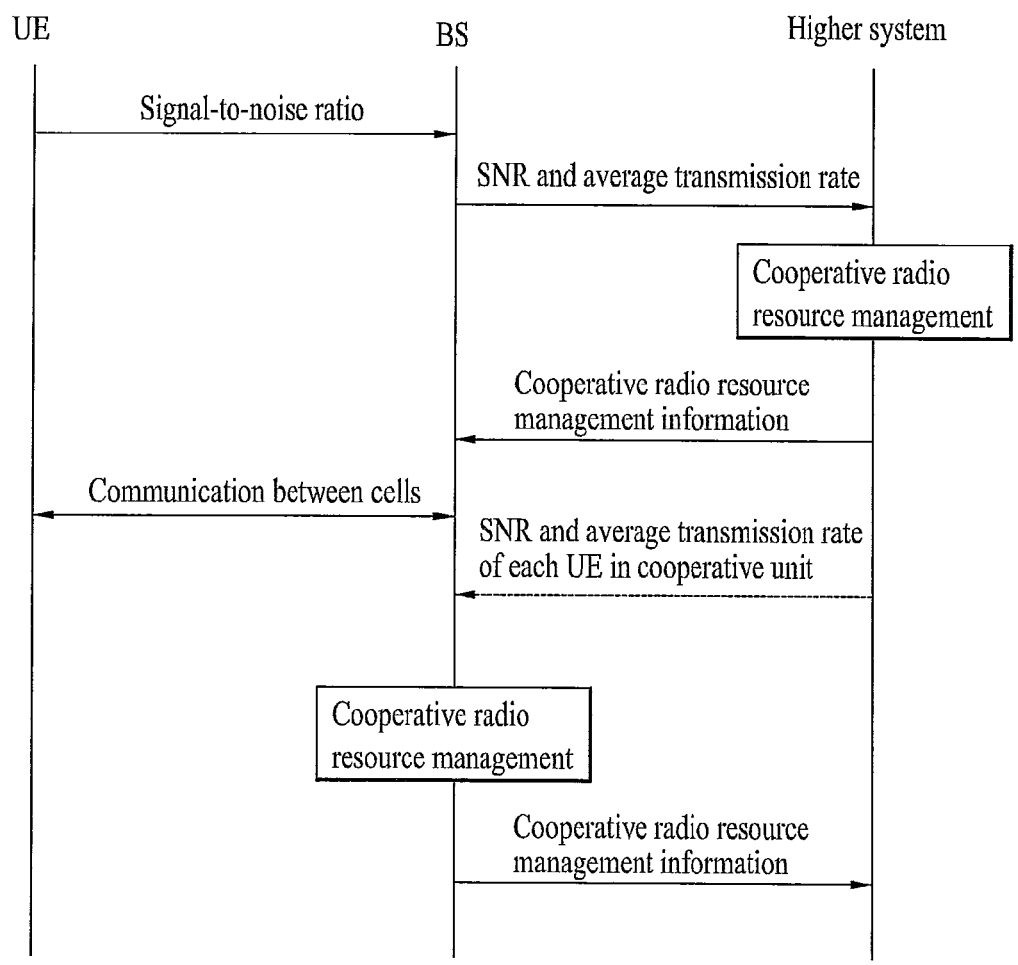
FIG. 11 illustrates a first cooperative radio resource management scheme according to an embodiment of the present invention.

FIG. 11 illustrates a desirable embodiment of the first cooperative radio resource management scheme according to the present invention.

Referring to FIG. 11, a UE can measure SNRs with respect to searchable BSs in a cooperative unit and transmit the SNRs to BSs belonging to the cooperative unit. At this time, the UE can transmit the SNRs to the BSs in the cooperative unit at a predetermined interval in consideration of system and channel environments in order to transmit an optimum SNR and average transmission rate.

The SNR and average rate transmission interval can be determined by one BS in the cooperative unit or a higher system. In addition, the SNR and average rate transmission interval can be dynamically determined.

The BSs can detect channel gains of corresponding channels in consideration of dispersion of noise using the SNRs received from the UE. The BSs can transmit SNRs and average transmission rates of all UEs belonging to cells to the higher system at the SNR and average rate transmission intervals. An interval of transmission of SNRs and average transmission rates from each BS to the higher system can be equal to the interval of transmission of SNRs from the UE to the BSs. The higher system can perform radio resource management using SNRs and current average transmission rates of UEs, transmitted from the BSs in the cooperative unit. A description will be given of a method of performing radio resource management by the higher system according to the first cooperative radio resource management scheme.

Radio resource management can be carried out such that proportional fairness is maximized while average rages of all UEs in a cooperative unit meet the minimum average transmission rate $R_{min}$. This can be formulated using the following mathematical expressions.

Mathematical expression 18 represents an instantaneous transmission rate that a k-th UE can obtain in an n-th subchannel when the k-th UE is scheduled at a scheduling time t in the case of uplink.

$$r_{n,k}(t) = \log_2\left(1 + \frac{P_{n,k}(t)|h_{n,k,b}(t)|^2}{N_0 + \sum_{\substack{b' \in c \\ b' \neq b}} P_{n,k_{b'}^*}(t)|h_{k_{b'}^*,b}|^2}\right) \quad [bps/\text{Hz}]$$

[Mathematical expression 18]

Here, $P_{n,k}(t)$ is transmit power of the k-th UE in the n-th subchannel at the scheduling time t, $P_{n,k_{b'}^*}(t)$ is transmit power of a $k_{b'}^*$-th UE, which belongs to a set $U_{b'}$ of UEs of a BS b included in a cooperative unit c, at the scheduling time t when the $k_{b'}^*$-th UE is scheduled in the n-th subchannel, $h_{n,k,b}(t)$ represents a channel between the k-th UE and the BS b in the n-th subchannel at the scheduling time t, and $h_{k_{b'}^*,b}$ represents a channel between the $k_{b'}^*$-th UE and the BS b.

Mathematical expression 19 represents an instantaneous transmission rate that the k-th UE can obtain in the n-th subchannel when the k-th UE is assigned power at the scheduling time t in the case of downlink.

$$r_{n,k}(t) = \log_2\left(1 + \frac{P_{n,b}(t)|h_{n,b,k}(t)|^2}{N_0 + \sum_{\substack{b' \in c \\ b' \neq b}} P_{n,b'}(t)|h_{b',k}|^2}\right) \quad [bps/\text{Hz}]$$

[Mathematical expression 19]

Here, $P_{n,b}(t)$ and $P_{n,b'}(t)$ respectively denote transmit power of the BS b and transmit power of a BS b' at the scheduling time t in the n-th subchannel, $h_{n,b,k}(t)$ represents a channel between the BS b and the k-th UE in the n-th subchannel at the scheduling time t, and $h_{b',k}$ represents a channel between the BS b' and the k-th UE.

Mathematical expression 20 represents an average transmission rate of the k-th UE included in the set $U_b$ of the UEs of the BS b belonging to the cooperative unit c at a scheduling time (t+1).

$$R_k(t+1) = \left(1 - \frac{1}{t}\right)R_k(t) + \frac{1}{tN_s}\sum_{n=1}^{N_s} I_{n,k}(t)r_{n,k}(t)[bps/Hz]$$ [Mathematical expression 20]

Here, $N_s$ is the number of subchannels and $I_{n,k}(t)$ is a function that indicates 0 when the k-th UE is scheduled at the scheduling time t in the n-th subchannel and indicates 0 when it is not.

Mathematical expression 21 represents the sum of levels of dissatisfaction of the minimum average transmission rate of the UEs in the cooperative unit.

$$\sum_{b \in c}\sum_{k \in U_b} [R_{min} - R_k(t+1)]^+$$ [Mathematical expression 21]

Here, Rmin is the minimum average transmission rate, and [ ]+ represents 0 when the value of [ ] is smaller than 0 and, when the value of [ ] is larger than 0, represents the value.

To ensure the minimum average transmission rate of UEs, radio resource management needs to be performed such that mathematical expression 4 is minimized.

Mathematical expression 22 takes proportional fairness into account in addition to securing the minimum average transmission rate of UEs.

$$\max\sum_{b \in c}\sum_{k \in U_b} \log R_k(t+1) - \omega_{QoS}\sum_{b \in c}\sum_{k \in U_b} [R_{min} - R_k(t+1)]^+$$ [Mathematical expression 22]

Here, $\omega_{QoS}$ is a constant indicating a level of ensuring the minimum average transmission rate of each UE. When $\omega_{QoS}$ increases, radio resource management is performed in preferential consideration of securing the minimum average transmission rates of UEs. The higher system can assign radio resources including time, frequency and transmit power to UEs such that the radio resources meet the mathematical expression 22. The higher system can perform radio resource management that satisfies the mathematical expression 5 since it has knowledge of the current average transmission rates of all UEs included in the cooperative unit as well as SNRs of all BSs and all the UEs belonging to the cooperative unit.

For example, the higher system can carry out UE selection and power allocation for each cell such that proportional fairness is maximized when all the UEs in the cooperative unit maintain average transmission rates higher than the minimum average transmission rate. In addition, the higher system can manage radio resources such that the solution of the mathematical expression 4 is minimized if any of the UEs in the cooperative unit does not satisfy the minimum average transmission rate. It is desirable that the cooperative radio resource management is performed such that communication performance deterioration is effectively overcome to satisfy the minimum average transmission rate.

Consequently, the higher system can transmit information about the executed cooperative radio resource management to the BSs in the cooperative unit and the BSs can carry out cell cooperative communication using the received information.

When one of the BSs in the cooperative unit rather than the higher system performs the first cooperative radio resource management scheme, the corresponding BS can receive SNRs and current average transmission rates of UEs belonging to the cooperative unit from the higher system and execute radio resource management in the same manner as the above-mentioned scheme performed by the higher system. In addition, the BS can transmit information about the result of the cooperative radio resource management to the higher system.

Figure 12:
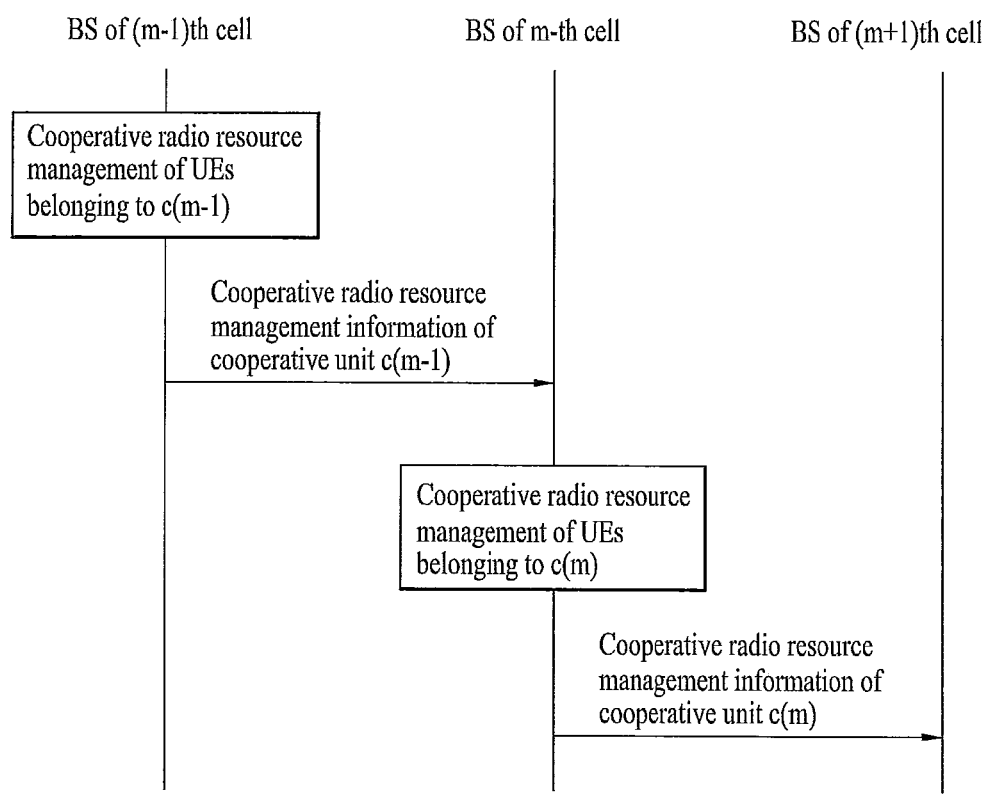
FIG. 12 illustrates a second cooperative radio resource management scheme according to an embodiment of the present invention.

FIG. 12 illustrates a desirable embodiment of the second cooperative radio resource management scheme according to the present invention.

Referring to FIG. 12, a UE can measure SNRs with respect to searchable BSs in a cooperative unit and transmit the SNRs to BSs belonging to the cooperative unit. Similarly to the first cooperative radio resource management scheme, the UE can transmit the SNRs to other BSs in the cooperative unit at a predetermined interval in consideration of system and channel states in order to transmit information including an optimum SNR and average transmission rate. The SNR and average rate transmission interval can be determined by one of the BSs belonging to the cooperative unit. Further, this interval can be determined dynamically.

The second cooperative radio resource management scheme can determine the order of cells (or BSs) such that the BSs may sequentially perform radio resource management. For example, a BS can perform cooperative radio resource management using information including cooperative radio resource information and SNRs and average transmission rates of UEs, obtained by the previous BS. In addition, the BS can transmit cooperative radio resource information obtained as a result of the cooperative radio resource management, an average transmission rate of a selected UE, etc. to a BS belonging to the next cell. The average transmission rate of the selected UE can be transmitted at a predetermined average rate transmission interval.

For instance, if a set c(m) of first to m-th cells in a cooperative unit c is set, it is desirable that cooperative radio resource management is performed such that average transmission rates of all UEs belonging to the set c(m) of the first to m-th cells meet the minimum average transmission rate and proportional fairness is maximized. This can be formulated using the following mathematical expressions.

According to the second cooperative radio resource management scheme, a BS belonging to the m-th cell can allocate radio resources to UEs included in the m-th cell such that the mathematical expression 5 is satisfied. If all the UEs belonging to the cell set c(m) maintain average transmission rates higher than the minimum average transmission rate, UEs are selected and allocated transmit power such that proportional fairness is maximized. Conversely, if any of the UEs belonging to the set c(m) does not satisfy the minimum average transmission rate, radio resource management is performed such that $$\sum_{b \in c(m)}\sum_{k \in U_b} [R_{min} - R_k(t+1)]^+$$

is minimized so as to allow the UEs to meet the minimum average transmission rate.

The BS belonging to the m-th cell can transmit the result of the cooperative radio resource management performed above with the average transmission rate of a specific UE selected from set c(m) to a BS belonging to the (m+1)th cell. Upon completion of radio resource management by all the BSs in the cooperative unit, the BSs can perform cell cooperative communication on the basis of their cooperative radio resource management results.

Figure 13:
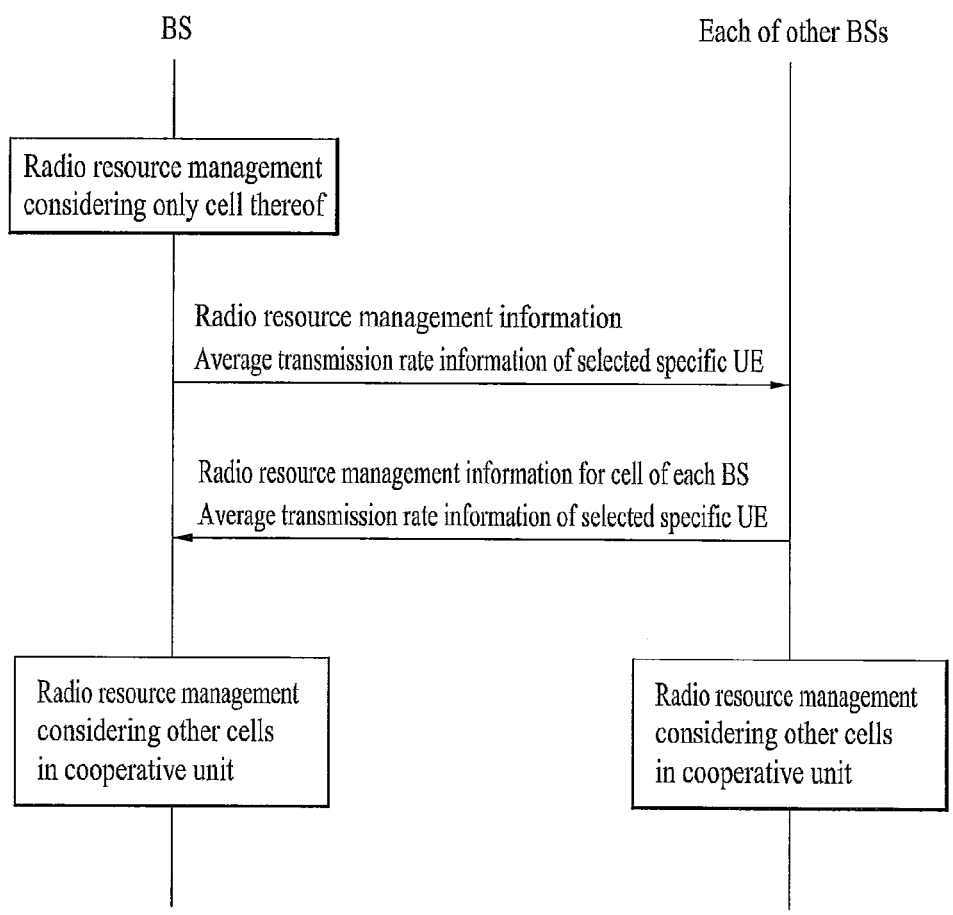
FIG. 13 illustrates a third cooperative radio resource management scheme according to an embodiment of the present invention.

FIG. 13 illustrates a desirable embodiment of the third cooperative radio resource management scheme according to the present invention.

Referring to FIG. 13, similarly to the first and second cooperative radio resource management schemes, the third cooperative radio resource management scheme is configured in such a manner that a UE measures SNRs with respect to searchable BSs in a cooperation unit and transmits the SNRs to other BSs in the cooperation unit. The UE can transmit the SNRs to the other BSs in the cooperative unit at a predetermined interval in consideration of system and channel states in order to transmit an optimum SNR and average transmission rate.

The SNR and average rate transmission interval can be determined by one of the BSs in the cooperative unit. One BS in the cooperative unit can determine an interval of transmission of an optimum SNR and average transmission rate in consideration of system and channel environments and inform other BSs in the cooperative unit of the determined transmission interval. This transmission interval can be dynamically determined.

In the third cooperative radio resource management scheme, each BS can perform radio resource management considering only a cell corresponding thereto, and then transmit the radio resource management result and average transmission rates of selected UEs to other BSs in the cooperative unit. Here, the average transmission rates of the selected UEs can be transmitted at a predetermined average rate transmission interval. Thereafter, each BS can carry out cooperative radio resource management simultaneously considering the cell including the BS and other cells using information received from other BSs.

A description will be given of a radio resource allocation and management method performed by a BS belonging to an arbitrary cell according to the third cooperative radio resource management scheme. For example, a BS b preferably performs primary radio resource management considering only the cell to which the BS b belongs such that average transmission rates of UEs included in the cell satisfy a minimum average transmission rate and proportional fairness is maximized. This radio resource management can be formulated using the following mathematical expression.

$$\max \sum_{k \in U_b} \log R_k(t+1) - \qquad \text{[Mathematical expression 23]}$$

$$\omega_{QoS} \sum_{k \in U_b} [R_{min} - R_k(t+1)]^+$$

If all the UEs belonging to the BS b maintain average transmission rates higher than the minimum average transmission rate during allocation of radio resources according to the third cooperative radio resource management scheme, UEs can be selected such that proportional fairness is maximized. If one or more UEs which do not satisfy the minimum average transmission rate are included in a set $U_b$, of the UEs of the BS b, it is desirable that radio resource management is performed such that $$\sum_{k \in U_b} [R_{min} - R_k(t+1)]^+$$

is minimized so as to allow the UEs to meet the minimum average transmission rate.

Each BS in the cooperative unit can transmit the result of the primary radio resource management performed on the UEs belonging to the cell thereof with an average transmission rate of a selected UE in the primary radio resource management to other BSs in the cooperative unit. The other BSs in the cooperative unit can perform secondary radio resource management such that average transmission rates of UEs satisfy the minimum average transmission rate and proportional fairness is maximized using the received information in consideration of other cells in the cooperative unit. This can be formulated using the following mathematical expression.

$$\sum_{b \in c} \sum_{k^* \in U_b} [R_{min} - R_{k^*}(t+1)]^+ \qquad \text{[Mathematical expression 24]}$$

Here, $k^* \in U_b$ represents specific UEs selected by BS b during the primary radio resource management performed by the BS b.

If specific UEs selected during the primary radio resource management performed by each BS in the cooperative unit include one or more UEs which do not satisfy the minimum average transmission rate when secondary radio resource allocation is performed according to the third cooperative radio resource management scheme, radio resource management is carried out such that mathematical expression 24 is minimized such that the UEs can satisfy the minimum average transmission rate. Conversely, when all UEs selected during the primary radio resource management performed by each BS in the cooperative unit maintain average transmission rates higher than the minimum average transmission rate, power allocation can be executed such that proportional fairness is maximized using the following mathematical expression 25.

$$\max \sum_{b \in c} \sum_{k^* \in U_b} \log R_{k^*}(t+1) - \qquad \text{[Mathematical expression 25]}$$

$$\omega_{QoS} \sum_{b \in c} \sum_{k^* \in U_b} [R_{min} - R_{k^*}(t+1)]^+$$

Here, $R_{k^*}(t+1)$ can be represented as the following mathematical expression 26.

$$R_{k^*}(t+1) = \left(1 - \frac{1}{t}\right) R_{k^*}(t) + \qquad \text{[Mathematical expression 26]}$$

$$\frac{1}{tN_s} \sum_{n=1}^{N_s} I_{n,k^*}(t) r_{n,k}(t) [bps/\text{Hz}]$$

Here, $rn,k^*(t)$ can be represented as the following mathematical expression 27.

$$r_{n,k^*}(t) = \quad \text{[Mathematical expression 27]}$$

$$\log_2\left(1 + \frac{p_{n,k^*}(t)|h_{n,k^*,b}(t)|^2}{N_o + \sum_{b' \in c, b' \neq b} p_{n,k_b^*}(t)|h_{k_{b'}^*,b}|^2}\right)$$

Here, $\omega_{QoS}$ is a constant indicating a level of ensuring the minimum average transmission rate of each UE. When $\omega_{QoS}$ increases, it is desirable that radio resource management is performed in preferential consideration of securing the minimum average transmission rates of UEs.

Then, each BS in the cooperative unit can perform secondary cooperative radio resource management and carry out cell cooperative communication on the basis of the result of the secondary cooperative radio resource management.

Figure 14:
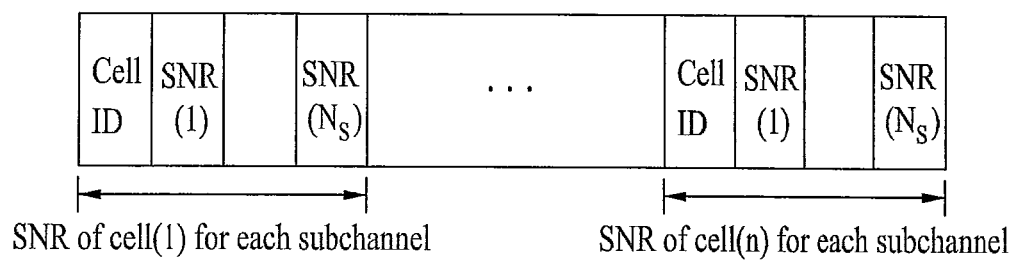
FIG. 14 illustrates an exemplary signal carrying signal-to-noise ratio information about each subchannel of searchable cells required for cell cooperative radio resource management, which is transmitted from a UE to a BS.

FIG. 14 illustrates an exemplary signal transmitted by a UE to a BS, which carries information on subchannel-based SNRs of searchable cells, required for cell cooperative radio resource management.

Referring to FIG. 14, the signal can be transmitted from the UE to the BS through a radio channel. The SNRs can be quantized into bits and transmitted. Here, a quantization level, that is, the number of bits required to indicate the SNRs, can be determined depending on system and channel states. Each UE can arrange IDs of searchable cells and SNRs in the order of subchannels and transmit them to BSs.

Figure 15:
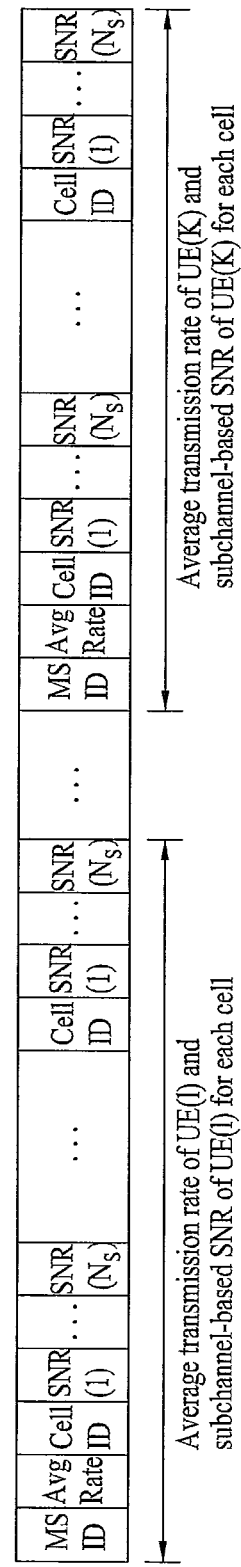
FIG. 15 illustrates an exemplary signal transmitted by a BS to a higher system for cooperative radio resource management in the first cooperative radio resource management scheme.

FIG. 15 illustrates an exemplary signal transmitted by a BS to a higher system for cooperative radio resource management in the first cooperative radio resource management scheme.

Referring to FIG. 15, in the first cooperative radio resource management scheme, each BS in a cooperative unit can transmit ID of each UE, an average transmission rate of the UE, and subchannel-based SNRs of searchable cells, measured and transmitted by the UE, to the higher system for cell cooperative radio resource management. The signal can be transmitted from the BS to the higher system through a wired channel or a radio channel, the average transmission rate of each UE can be quantized into bits and transmitted. Here, the number of bits required to indicate the average transmission rate can be determined depending on system and channel states.

Figure 16:
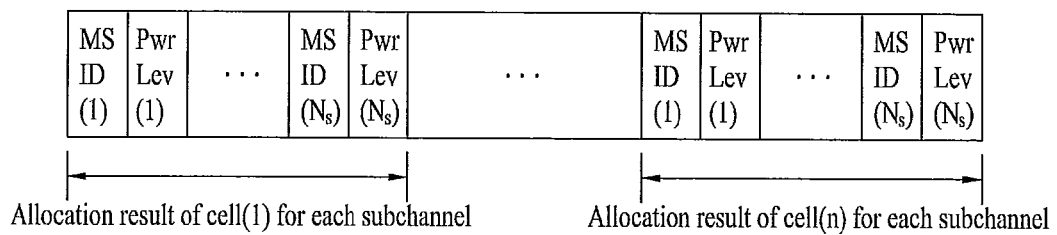
FIG. 16 illustrates an exemplary signal representing a result of cooperative radio resource management executed by a higher system in the first cooperative radio resource management scheme, which is transmitted from the higher system to each BS in a cooperative unit.

FIG. 16 illustrates an exemplary signal representing a result of cooperative radio resource management executed by a higher system in the first cooperative radio resource management scheme, which is transmitted from the higher system to each BS in a cooperative unit.

Referring to FIG. 16, the higher system can transmit a signal composed of ID of a UE selected in a subchannel of each cell and power allocation information (Pwr Lev) to each BS. The signal can be delivered to each BS through a wired channel or a radio channel. The power allocation information can be quantized into bits and transmitted. The number of bits required to indicate the power allocation information can be determined depending on system and channel states.

FIG. 17 illustrates an exemplary signal transmitted by an m-th BS for cooperative radio resource management of an (m+1)-th BS in the second cooperative radio resource management scheme.

Referring to FIG. 17, the m-th BS can perform radio resource management of the cell corresponding thereto, and then transmit IDs of UEs selected from first to m-th cells by subchannels, power allocation information (Pwr Lev), and average transmission rates of the selected UEs to the (m+1)-th BS. The signal can be transmitted through a wired channel or a radio channel.

Figures 18, 19:
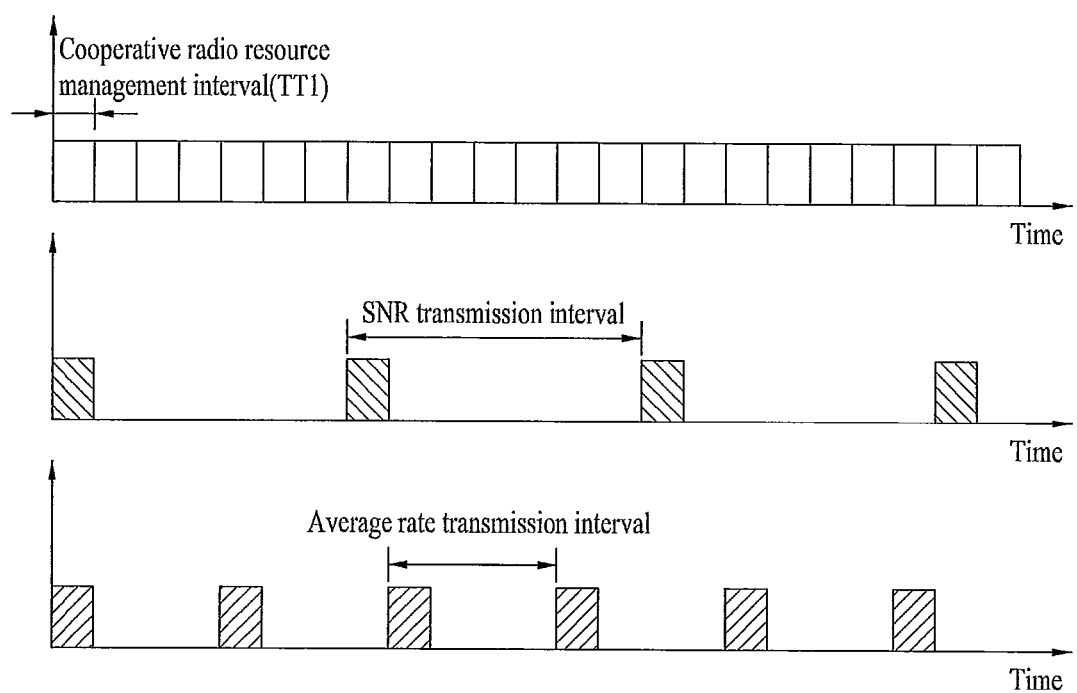
FIG. 18 illustrates an exemplary signal representing a result of first cooperative radio resource management performed by a BS in the third cooperative radio resource management scheme, which is transmitted from the BS to other BSs.
FIG. 19 shows a signal-to-noise ratio and an average transmission rate transmission interval in comparison with a cooperative radio resource management interval according to the present invention.

FIG. 18 illustrates an exemplary signal representing a result of first cooperative radio resource management performed by a BS in the third cooperative radio resource management scheme, which is transmitted from the BS to other BSs.

Referring to FIG. 18, each BS can transmit the result of the first cooperative radio resource management, that is, IDs of selected subchannel-based UEs and the average transmission rates of the selected UEs, to other BSs in a cooperative unit. Here, the signal can be transmitted through a wired channel or a radio channel.

FIG. 19 shows SNR and average rate transmission intervals in comparison with a cooperative radio resource management interval according to the present invention.

Referring to FIG. 19, the cooperative radio resource management interval can be represented as a transmission time interval (TTI), for example. The SNR transmission interval and the average rate transmission interval can be also represented as a TTI. The SNR transmission interval and the average rate transmission interval can be determined by a separate cooperative radio resource management scheme determination device in the first, second and third cooperative radio resource management schemes.

The SNR transmission interval and the average rate transmission interval can be determined by a higher system or one of BSs in a cooperative unit in the first cooperative radio resource management scheme. In addition, the SNR transmission interval and the average rate transmission interval can be determined by each BS or one BS in a cooperative unit in the second and third cooperative radio resource management schemes.

The SNR transmission interval and the average rate transmission interval may be equal to the cooperative radio resource management interval to achieve the best radio resource management performance. However, the SNR transmission interval and the average rate transmission interval may be longer than the cooperative radio resource management interval in consideration of system and channel states in order to decrease overhead involved in the radio resource management and reduce the amount of exchanged information in a wired network or a wireless network.

When a channel does not abruptly vary with time, that is, when the channel has low time selectivity, the SNR transmission interval can be increased so as to accomplish performance similar to that achieved with a short SNR transmission interval while considerably reducing overhead.

Figure 20:
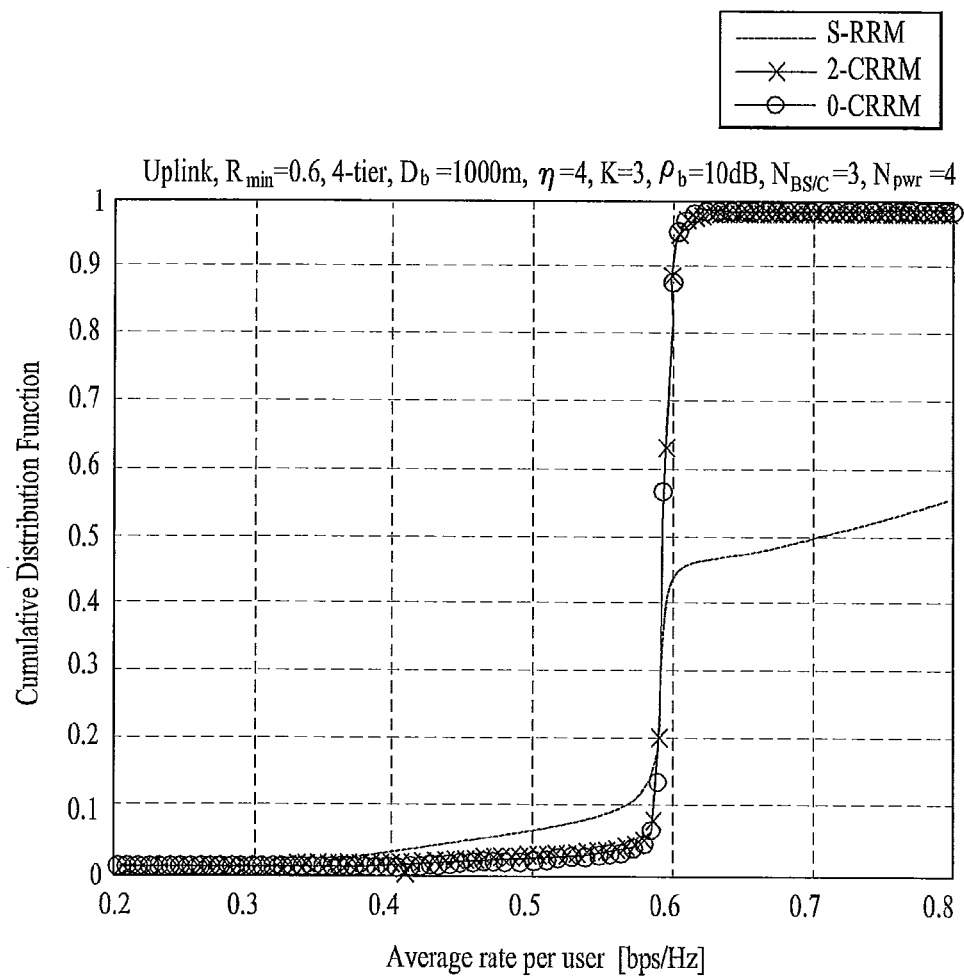
FIG. 20 shows a CDF of an average transmission rate according to a radio resource management scheme in a single subchannel system.

FIG. 20 shows a CDF of an average transmission rate according to a radio resource management scheme in a single subchannel system.

FIG. 20 illustrates a CDF of an average transmission rate of a UE n the uplink of a subchannel system according to the proposed cooperative radio resource management schemes (the first cooperative radio resource management scheme of the present invention (optimal-cooperative radio resource management (O-CRRM) and the third cooperative radio resource management scheme of the present invention (2-cooperative radio resource management (2-CRRM)), which is obtained through simulations. FIG. 20 also shows the performance of S-RRM which performs radio resource management for each cell without using cell cooperative radio resource management.

Simulation setup is established on the basis of the radius of the cell, 1 km (Db=1 km), a path fading index is 4 ($\eta$=4) in the network, a required minimum average transmission rate of 0.6 bits/Hz (Rmin=0.6), 4 tiers including 61 cells. It is assumed that the number of UEs per cell is 3 (k=3), an SNR at the cell edge is 100 dB (ρb=10 dB), a power level during allocation is 4 (N_pwr=4), and the number of BSs per cluster is 3.

In a system which needs to preferentially consider ensuring quality of service (QoS) of UEs, the influence of interference can be effectively reduced through efficient cooperation between BSs when the cooperative radio resource management proposed by the present invention is performed so as to ensure QoS of an increased number of UEs compared to S-RRM which performs radio resource management for each cell. This can be confirmed from the graph shown in FIG. 20.

In addition, it can be confirmed that the third cooperative radio resource management scheme, which requires a considerably small amount of exchanged information compared to the first cooperative radio resource management scheme, achieves the performance similar to that of the first cooperative radio resource management scheme.

Figure 21:
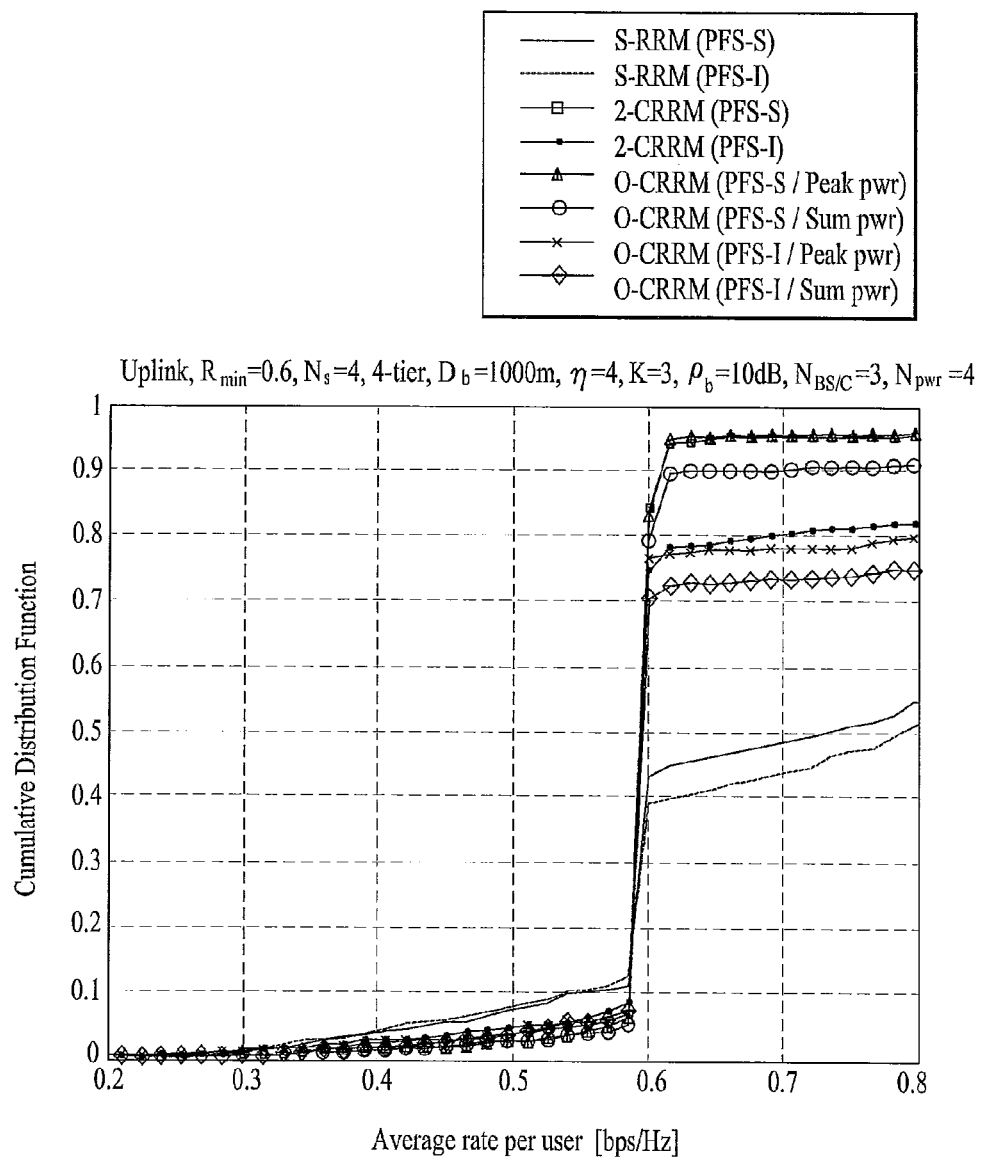
FIG. 21 shows a CDF of an average transmission rate according to radio resource management schemes in a multi-subchannel system.

FIG. 21 shows a CDF of an average transmission rate according to radio resource management schemes in a multi-subchannel system.

FIG. 21 illustrates a CDF of an average transmission rate on uplink of the multi-subchannel system according to the proposed cooperative radio resource managements (the first cooperative radio resource management scheme (O-CRRM) and the third cooperative radio resource management scheme (2-CRRM) of the present invention), which was obtained through simulations. Furthermore, FIG. 21 also shows the performance of S-RRM which performs radio resource management for each cell without cell cooperative radio resource management.

In each cooperative radio resource management scheme, PFS-S which cumulates an average transmission rate without respect to allocation results in previous subchannels when a UE is selected for each subchannel and PFS-I which cumulates the average transmission rate considering the allocation results in the previous subchannels are performed. The third cooperative radio resource management scheme is performed in consideration of a case in which a peak power that can be allocated to each subchannel is limited (peak power constraint) and a case in which a maximum sum of powers allocated to all subchannels is limited (sum power constraint).

It is assumed that simulation setup such as a system and channels is identical to that of the single subchannel system of FIG. 20 and the number of subchannels is 4. It can be confirmed that inter-cell interference is effectively reduced through cooperation between BSs to ensure QoS of an increased number of UEs when the cooperative radio resource management scheme proposed by the present invention is performed in the multi-subchannel system.

Furthermore, it can be confirmed that flexible use of a channel among subchannels based on the sum power constraint condition shows more improved performance than use of the peak power constraint condition. In addition, FPS-S produces performance higher than FPS-I in this simulation setup.

As described above, multiple calculations for dirty paper coding are not needed in a multiplex cellular communication system which performs cell cooperative communication, and the influence of inter-cell interface can be effectively reduced with a low overhead and a small amount of calculations, compared to conventional schemes, by allocating radio resources such as power, time and frequency through the cell cooperative radio resource management scheme.

Moreover, the cell cooperative radio resource management scheme according to the present invention can be dynamically selected and performed depending on system and channel states. In addition, SNR and average rate transmission intervals suitable for the system and channel states can be determined so as to reduce overhead and complexity involved in cooperative radio resource management compared to the conventional schemes.

Furthermore, the cooperative radio resource management scheme according to the present invention can ensure minimum transmission rates of an increased number of UEs, compared to the conventional schemes, by simultaneously considering all UEs.

Figure 22:
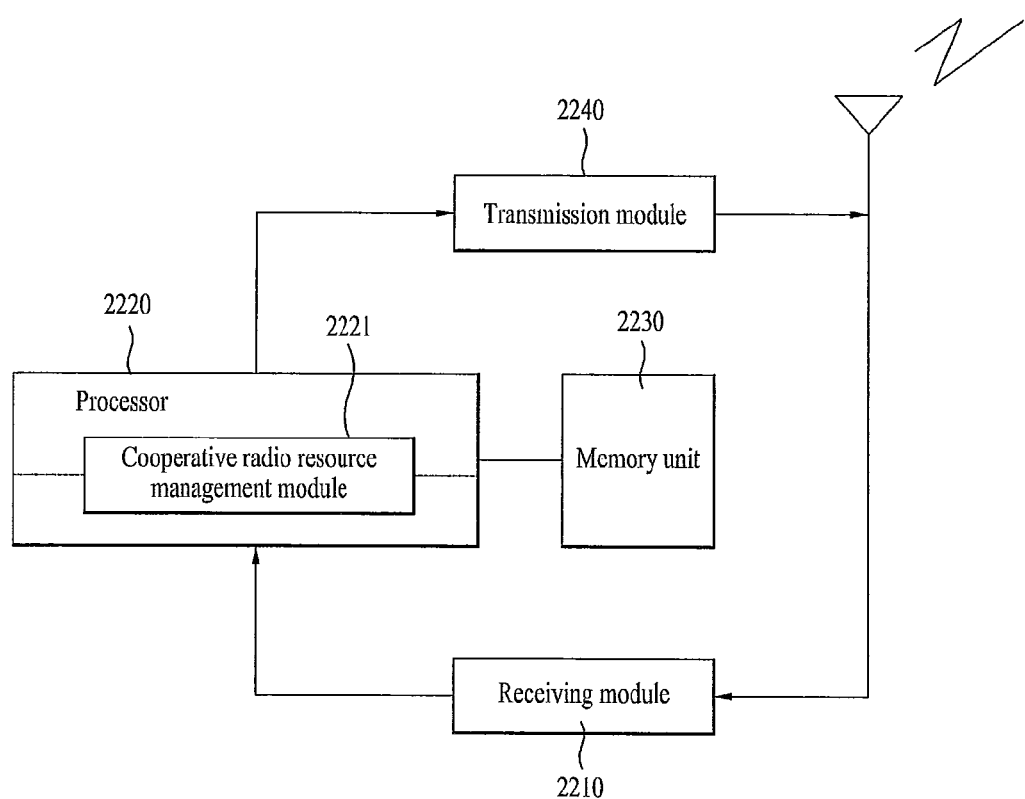
FIG. 22 is a block diagram of a BS device which performs cooperative radio resource management according to an embodiment of the present invention.

FIG. 22 is a block diagram of a BS device which performs cooperative radio resource management according to an embodiment of the present invention.

Referring to FIG. 22, the BS device according to an embodiment of the present invention includes a receiving module 2210, a processor 2220, a memory unit 2230, and a transmission module 2240. The processor 2220 includes a cooperative radio resource management module 2221. The receiving module 2210 can receive signals or information from other BSs or UEs in a cooperative unit.

The cooperative radio resource management module 2221 in the processor 2220 performs the cooperative radio resource management according to the present invention. In the case of the second cooperative radio resource management scheme, the cooperative radio resource management module 2221 can allocate radio resources including transmit power that ensures minimum average transmission rates of the UEs using information regarding cooperative radio resource management performed by a previous BS and SNRs and current average transmission rates of the UEs in the cooperative unit or UEs of a cell to which a BS using the BS device belongs.

In the second cooperative radio resource management scheme, the cooperative radio resource management module 2221 can allocate first radio resources including transmit power that ensures minimum average transmission rates of the UEs in the cell to which the BS using the BS device belongs using SNR information received from the UEs.

It is possible to allocate radio resources including transmit power that ensures a minimum average transmission rate of a specific UE selected from a cell including one of the other BSs in the cooperative unit using the first radio resource information, second radio resource information including transmit power that is assigned by each of the other BSs in the cooperative unit to ensure minimum average transmission rates of UEs included in a cell to which each BS belongs, and an average transmission rate of the specific UE.

The memory unit 2230 can store cooperative radio resource management information received from other BSs in the cooperative unit, SNR information received from UEs in the cooperative unit, etc.

The transmission module 2240 can transmit cooperative radio resource management information to other BSs or UEs in the cooperative unit.

Figure 23:
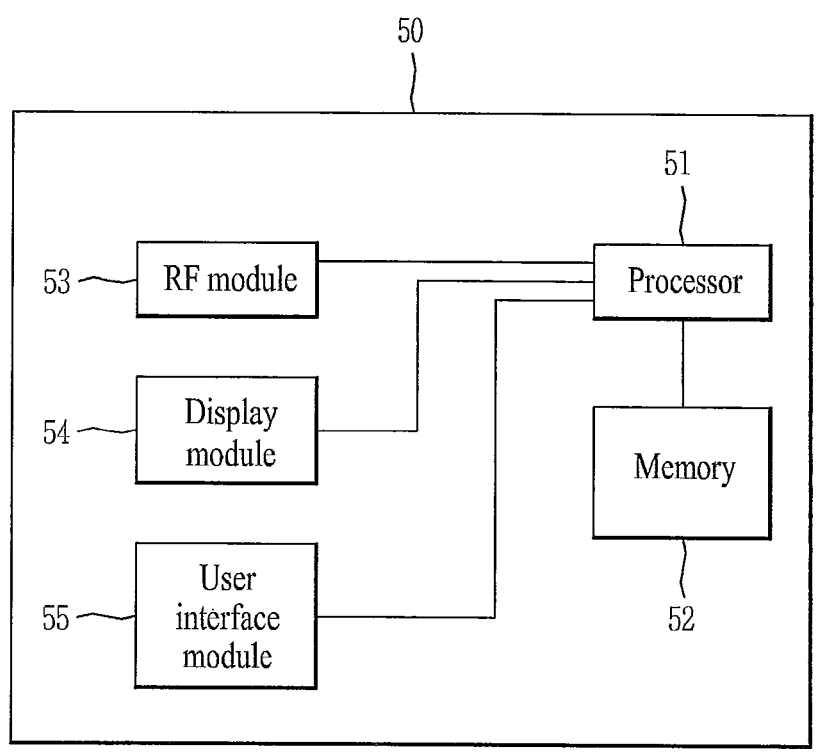
FIG. 23 is a block diagram showing components of a device 50 according to an embodiment of the present invention.

FIG. 23 is a block diagram showing components of a device 50 according to an embodiment of the present invention.

Referring to FIG. 23, the device 50 may be a UE, a BS, or a relay. The device 50 includes a processor 51, a memory 52, an RF module 53, a display module 54, and a user interface module 55.

Radio interface protocol layers are implemented in the processor 51. The processor 51 provides a control plane and a user plane. Functions of the layers can be implemented in the processor 51. The memory 52 is connected to the processor 51 and stores an operating system, applications, and general files. The RF module 53 is connected to the processor 51 and transmits/receives radio signals.

The display module 54 displays a variety of information items and can use a known component such as a liquid crystal display (LCD), an organic light emitting diode (OLED) display, etc.

The user interface module 55 can be configured with a combination of known user interfaces such as a keypad, touchscreen, etc.

Layers of radio interface protocol between a UE and a network can be classified as a first layer L1, a second layer L2 and a third layer L3 on the basis of lower three layers of open system interconnection (OSI) model known in communication systems. A physical layer is included in the first layer and provides an information transmission service through a physical channel. A radio resource control (RRC) layer belongs to the third layer and provides control ratio resources between the UE and the network. The UE and the network exchange RRC messages through the RRC layer.

The aforementioned embodiments are achieved by combination of elements and features of the present invention in a predetermined manner. Each of the elements or features should be considered selectively unless specified separately. Each of the elements or features may be carried out without being combined with other elements or features. Also, some elements and/or features may be combined with one another to constitute the embodiments of the present invention. The order of operations described in the embodiments of the present invention may be changed. Some elements or features of one embodiment may be included in another embodiment, or may be replaced with corresponding structural elements or features of another embodiment. It is apparent that claims which are not in an explicit quotation relation can be combined to constitute an embodiment and included as a new claim according to amendment after application.

The embodiments according to the present invention can be implemented by various means, for example, hardware, firmware, software, or combination thereof. In a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The BS cooperative power control method and the cooperative radio resource management method according to the present invention can be applied to 3GPP LTE, LTE-A, IEEE 802.16 systems, which are exemplary mobile communication systems.

The invention claimed is:

1. A method for controlling power cooperatively among two or more base stations (BSs) in a cooperative unit, the method comprising:
   receiving, at a specific BS in the cooperative unit from a specific user equipment (UE) located on a cell edge of the specific BS, an average transmission rate of the specific UE and a token value that indicates an up-to-date level of satisfaction of a minimum average transmission rate of the specific UE;
   receiving, at the specific BS, information including average transmission rates of UEs located on cell edges of one or more other BSs in the cooperative unit, token values of the UEs located on the cell edges, and current power levels of the one or more other BSs from the one or more other BSs;
   calculating, at the specific BS, a first power level vector of each of the BSs in the cooperative unit, which guarantees minimum average transmission rates of UEs located on cell edges of the BSs, using the minimum average transmission rates and token values of the specific UE and the UEs located on the cell edges of the one or more other BSs in the cooperative unit; and
   calculating, at the specific BS, a second power level vector corresponding to an updated power level of each of the BSs in the cooperative unit based on current power levels of the BSs and the first power level.

2. The method of claim 1, further comprising:
   transmitting, at the specific BS, information including the average transmission rate and the token value of the specific UE and a current power level of the specific BS to other BS in the cooperative unit.

3. The method of claim 2, wherein the second power level vector $\overline{P}(t+1)$ is calculated by the following mathematical expression B $$\overline{P}(t+1) = \min(P_{max}, \max(0, \overline{P}(t) + \beta(\overline{P} - \overline{P}(t)))) \quad \text{[Mathematical expression B]}$$

wherein $\overline{P}(t)$ represents a current power level vector of a BS and $\beta$ is a power control constant.

4. The method of claim 3, wherein the second power level vector for a specific subchannel is calculated by the following mathematical expression D $$\overline{P}(t,s) = \min(P_{max}^s, \max(0, \overline{P}(t,s-1) + \beta(\overline{P} - \overline{P}(t,s-1)))) \quad \text{[Mathematical expression D]}$$

wherein s is a subchannel index, $\beta$ is a power control constant, and t is time.

5. The method of claim 1, wherein the first power level vector of each BS in the cooperative unit is calculated by the metric of the following mathematical expression A to ensure the minimum average transmission rates of the UEs located on the cell edges of the BSs and proportional fairness among cells,

[Mathematical expression A]

$$\max_{\mathcal{P}} \left[ \sum_{b \in c} \log R_{b,k}(t+1), k \in U_b \cap U_E \right] =$$

$$\max_{\mathcal{P}} \left[ \sum_{b \in c} \log \left( \left(1 - \frac{1}{I}\right) e^{-\alpha T_{b,k}(t)} R_{b,k}(t) + \right. \right.$$

-continued $$\frac{1}{t}\log\left(1+\frac{\overline{P}_{b,k}(t)|h_{b,k}(t)|^2}{N_0+\sum_{b'\in c, b'\neq b}\overline{P}_{b',k}|h_{b',k}(t)|^2}\right)\right), k\in U_b\cap U_E\right]$$

subject to $R_{b,k}(t+1)\geq R_{min}$, $\forall b\in c$, $\forall k\in U_b\cap U_E$ $0\leq P_{b,k}(t)\leq P_{max}$, $\forall b\in c$, $\forall k\in U_b\cap U_E$ where $R_{b,k}(t)$ is an average transmission rate of a k-th UE of the BS b, $|h_{b,k}(t)|^2$ is an average channel value between the BS b and the k-th UE of the BS b, $U_b$ represents a set of UEs provided with a service from the BS b, $U_E$ represents a set of cell edge UEs, a denotes a token weight function, $T_{b,k}(t)$ is a token value of the k-th UE of the BS b, $P_{max}$ denotes maximum transmit power of a BS, $N_0$ represents average power of noise, and Rmin is a minimum average transmission rate.

6. The method of claim 5, wherein the token value is updated using the following mathematical expression C $T_{b,k}(t+1)=\max\{0,T_{b,k}(t)+R_{min}-r_{b,k}(t)\}$ [Mathematical expression C]

wherein $r_{b,k}(t)$ is an instantaneous transmission rate at a time t and is represented as $$r_{b,k}(t)=\log\left(1+\frac{\overline{P}_{b,k}(t)|h_{b,k}(t)|^2}{N_0+\sum_{b'\in c, b'\neq b}\overline{P}_{b',k}(t)|h_{b',k}(t)|^2}\right),$$

Rmin a minimum average transmission rate, and $|h_{b,k}(t)|^2$ denotes an average channel value between the BS b and the k-th UE of the BS b.

7. The method of claim 5, wherein the first power level vector for a specific subchannel includes surplus power unused in a subchannel prior to the specific subchannel and is calculated by the metric of the mathematical expression A.

8. The method of claim 7, wherein the token value for the specific subchannel is updated using the following mathematical expression E $T^*_{b,k}(t,s+1)=\max\{0,T^*_{b,k}(t,s)+R_{min}-r^*_{b,k}(t,s)\}$ [Mathematical expression E].

9. The method of claim 7, wherein the average transmission rate $R^*_{b,k}(i)$ of a UE for the specific subchannel is calculated by the following mathematical expression F $$R^*_{b,k}(t,s+1)=\left(1-\frac{1}{t}\right)R^*_{b,k}(t,s)+\frac{1}{tN_s}r^*_{b,k}(t,s)$$ [Mathematical expression F]

wherein s denotes a subchannel index, NS represents the number of entire subchannels, and $r^*_{b,k}(t,s)$ denotes an instantaneous transmission rate of an s-th subchannel at time t.

10. The method of claim 1, further comprising:
calculating, at the specific BS, a third power level vector of each BS in the cooperative unit, which guarantees the minimum average transmission rates of the UEs located at the cell edges of the BSs, using minimum average transmission rates and token values of UEs located on cell edges of BSs other than a BS having a minimum token value in the cooperative unit.

11. The method of claim 1, further comprising:
transmitting, at the specific BS, at least the first, second or third power level vectors to other BSs in the cooperative unit.

12. The method of claim 1, wherein one UE located on the cell edges of the BSs in the cooperative unit corresponds to one of a UE having a minimum average channel value with respect to a serving BS, a UE having a largest sum of interferences, a UE having a minimum average transmission rate, and a UE having a largest token value.

13. A base station (BS) for controlling power in cooperation with other BS in a cooperative unit, the BS comprising:
a first receiving unit configured to receive an average transmission rate of a specific UE located on a cell edge of the BS and a token value that indicates an up-to-date level of satisfaction of a minimum average transmission rate of the specific UE, from the specific UE;
a second receiving unit configured to receive information including average transmission rates of UEs located on cell edges of one or more other BSs in the cooperative unit, token values of the UEs located on the cell edges, and current power levels of the one or more other BSs from the one or more other BSs in the cooperative unit;
a first power level calculation unit configured to calculate a first power level vector of each of the BSs in the cooperative unit, which guarantees minimum average transmission rates of UEs located on cell edges of the BSs, using the minimum average transmission rates and token values of the specific UE and the UEs located on the cell edges of the one or more other BSs in the cooperative unit; and
a second power level calculation unit configured to calculate a second power level vector corresponding to an updated power level of each of the BSs in the cooperative unit based on current power levels of the BSs and the first power level.

14. The BS of claim 13, further comprising:
a transmitting unit configured to transmit information including the average transmission rate and the token value of the specific UE and a current power level of the specific BS to other BS in the cooperative unit.

15. The BS of claim 14, wherein the second power level calculation unit calculates the second power level vector $\overline{P}(t+1)$ using the following mathematical expression B $\overline{P}(t+1)=\min(P_{max},\max(0,\overline{P}(t)+\beta(\overline{P}-\overline{P}(t))))$ [Mathematical expression B]

wherein $\overline{P}(t)$ represents a current power level vector of a BS and β is a power control constant.

16. The BS of claim 15, wherein the second power level calculation unit calculates the second power level vector for a specific subchannel using the following mathematical expression D $\overline{P}(t,s)=\min(P_{max}{}^s,\max(0,\overline{P}(t,s-1)+\beta(\overline{P}-\overline{P}(t,s-1))))$ [Mathematical expression B]

wherein s is a subchannel index, β is a power control constant, and t is time.

17. The BS of claim 15, wherein the token value is updated using the following mathematical expression C $T_{b,k}(t+1)=\max\{0,T_{b,k}(t)+R_{min}-r_{b,k}(t)\}$ [Mathematical expression C]

wherein $r_{b,k}(t)$ is an instantaneous transmission rate at time t and represented as $$r_{b,k}(t) = \log\left(1 + \frac{\overline{P}_{b,k}(t)|h_{b,k}(t)|^2}{N_0 + \sum_{b'\in c, b'\neq b} \overline{P}_{b',k}(t)|h_{b',k}(t)|^2}\right),$$

Rmin a minimum average transmission rate, and $|h_{b,k}(t)|^2$ denotes an average channel value between a BS b and a k-th UE of the BS b.

18. The BS of claim 13, wherein the first power level calculation unit calculates the first power level vector $\overline{P}$ using the metric of the following mathematical expression A and ensures the minimum average transmission rates of the UEs located on the cell edges of the BSs and proportional fairness among cells,

[Mathematical expression A]

$$\max_{\overline{P}} \left[\sum_{b\in c} \log R_{b,k}(t+1), k \in U_b \cap U_E\right] =$$

$$\max_{\overline{P}}\left[\sum_{b\in c} \log\left(\left(1 - \frac{1}{t}\right)e^{-aT_{b,k}(t)} R_{b,k}(t) + \frac{1}{t}\log\left(1 + \frac{\overline{P}_{b,k}(t)|h_{b,k}(t)|^2}{N_0 + \sum_{b'\in c, b'\neq b} \overline{P}_{b',k}|h_{b',k}(t)|^2}\right)\right), k \in U_b \cap U_E\right]$$

subject to $R_{b,k}(t+1) \geq R_{min}$, $\forall b \in c, \forall k \in U_b \cap U_E$ $0 \leq P_{b,k}(t) \leq P_{max}$, $\forall b \in c, \forall k \in U_b \cap U_E$ where $R_{b,k}(t)$ is an average transmission rate of a k-th UE of a BS b, $|h_{b,k}(t)|^2$ is an average channel value between the BS b and the k-th UE of the BS b, $U_b$ represents a set of UEs provided with a service from the BS b, $U_E$ represents a set of cell edge UEs, a denotes a token weight function, $T_{b,k}(t)$ is a token value of the k-th UE of the BS b, $P_{max}$ denotes maximum transmit power of a BS, $N_0$ represents average power of noise, and Rmin a minimum average transmission rate.

19. The BS of claim 18, wherein the first power level calculation unit calculates the first power level vector for a specific subchannel using the mathematical expression A by adding surplus power unused in a subchannel prior to the specific subchannel to the first power level vector.

20. The BS of claim 13, further comprising:
  a third power level calculation unit configured to guarantee the minimum average transmission rates of the UEs located at the cell edges of the BSs using minimum average transmission rates and token values of UEs located on cell edges of BSs other than a BS having a minimum token value in the cooperative unit.

* * * * *